(12) United States Patent
Likhomanov et al.

(10) Patent No.: US 12,450,904 B2
(45) Date of Patent: Oct. 21, 2025

(54) USER-CUSTOMIZED COMPUTER VISION EVENT DETECTION

(71) Applicant: Amazon Technologies, Inc., Seattle, WA (US)

(72) Inventors: Dmytro Likhomanov, Kyivska oblast (UA); Ashwini Vijaykumar Karappa, Sunnyvale, CA (US); Apurva Mohan Paralkar, Fremont, CA (US); Oleksandr Onbysh, London (GB); Alexander Lazarev, Seattle, WA (US); Pylyp Kofman, Amsterdam (NL); Yevhen Diachenko, Zaporizhzhya (UA); Kostiantyn Shysh, Pidhorodne (UA); Denys Drabchuck, Utrecht (NL); Serhii Kupriienko, Kyiv (UA); Mykola Zekter, Kyiv (UA); Vasyl Zacheshyhryva, Haarlem (NL); Bohdan Bobyl, Kyiv (UA); Kateryna Voroniuk, Seattle, WA (US); Andrii Kozak, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 410 days.

(21) Appl. No.: 17/855,337

(22) Filed: Jun. 30, 2022

(65) Prior Publication Data
US 2024/0005661 A1  Jan. 4, 2024

(51) Int. Cl.
  *G06V 20/40* (2022.01)
  *G06V 10/774* (2022.01)
  *G06V 20/52* (2022.01)

(52) U.S. Cl.
  CPC ............ *G06V 20/44* (2022.01); *G06V 10/774* (2022.01); *G06V 20/52* (2022.01)

(58) Field of Classification Search
  CPC ... G06V 10/82; G06V 20/52; G06N 3/02–105
  See application file for complete search history.

(56) References Cited

U.S. PATENT DOCUMENTS

| | | |
|---|---|---|
| 9,064,394 B1 | 6/2015 | Trundle |
| 2019/0278976 A1 | 9/2019 | Khadloya et al. |
| (Continued) | | |

FOREIGN PATENT DOCUMENTS

| | | |
|---|---|---|
| CN | 112184750 A | 1/2021 |
| WO | 2021167394 | 8/2012 |
| WO | 2021146700 | 7/2021 |

OTHER PUBLICATIONS

Augmenting Your Training Data for Image Recognition by Littleton Riggins, Published by Towards Data Science, Nov. 17, 2020 (Year: 2020).*

(Continued)

*Primary Examiner* — Gregory A Morse
*Assistant Examiner* — Ty Mitchell Beatty
(74) *Attorney, Agent, or Firm* — K&L Gates LLP

(57) ABSTRACT

Techniques are generally described for user-customized computer vision event detection. A camera device may capture a first frame of image data. A first machine learning model may generate first embedding data for the first frame of image data. The first embedding data may be input into a second machine learning model associated with the camera device. The second machine learning model and the first embedding data may be used to determine that an area-of-interest represented by the first frame of image data is in a first state. State data stored in memory may be determined. The state data may indicate that the area-of-interest was previously in a second state. An alert may be sent to a device associated with the camera device indicating that the area-of-interest has changed from the second state to the first state.

19 Claims, 21 Drawing Sheets

(56) References Cited

U.S. PATENT DOCUMENTS

| | | | |
|---|---|---|---|
| 2021/0209369 A1* | 7/2021 | Timor | G06T 7/254 |
| 2021/0224571 A1 | 7/2021 | Vartakavi et al. | |
| 2022/0139180 A1* | 5/2022 | Jahromi | G08B 13/19613 |
| | | | 382/103 |
| 2022/0229488 A1* | 7/2022 | Akimoto | A61B 5/18 |

OTHER PUBLICATIONS

Logistic Regression Vs Support Vector Machines (SVM) by Patricia Bassey, Published in Axum Labs, Sep. 19, 2019 (Year: 2019).*
Performance evaluation of binary classifiers by Kevin P. Murphy, Published by The University of British Columbia, Oct. 10, 2007 (Year: 2007).*
Bello; International Search Report and Written Opinion of PCT/US2023/026451; Sep. 8, 2023; 13 pgs.

* cited by examiner $X_{image1}^T * W =$ $X_{image1}^T$ [4 | 19 | 7 | -23 | 32 | ... | 29 | -70]

$$S_{image1} = \frac{1}{1+e^{-(X^T * W)}} \quad \swarrow 1002$$

$$S_{image1} = \frac{1}{1+e^{-(0.712)}} = \boxed{0.329} \quad \swarrow 112$$

FIG. 11

$$Loss = -y_{actual} \log(y_{predicted}) - (1-y_{actual})\log(1-y_{predicted})$$

$$Loss = -y \log(y') - (1-y)\log(1-y')$$

$$L_{image1} = -y_{image1} \log(y'_{image1}) - (1-y_{image1})\log(1-y'_{image1})$$

FIG. 12

$$\nabla_W L_{image1} = \begin{bmatrix} \frac{dL}{dw_1} \\ \frac{dL}{dw_2} \\ \vdots \\ \frac{dL}{dw_n} \end{bmatrix} = \begin{bmatrix} (y'_{image1} - y_{image1}) x_{image1,1} \\ (y'_{image1} - y_{image1}) x_{image1,2} \\ \vdots \\ (y'_{image1} - y_{image1}) x_{image1,n} \end{bmatrix} = \begin{bmatrix} (0.329)*4 \\ (0.329)*19 \\ \vdots \\ (0.329)*-70 \end{bmatrix} = \begin{bmatrix} 1.316 \\ 6.251 \\ \vdots \\ -23.030 \end{bmatrix}$$

$X^T_{image1}$: [ 4 | 19 | 7 | -23 | 32 | ... | 29 | -70 ]

FIG. 13

$$W_{updated} = W_{original} + -z * \nabla_W L_{image1}$$

step size $$W_{updated} = \begin{array}{|c|} \hline 0.1 \\ \hline -0.4 \\ \hline -0.2 \\ \hline 0.6 \\ \hline 32 \\ \hline ... \\ \hline -0.8 \\ \hline -0.2 \\ \hline \end{array} + -(0.1) * \begin{array}{|c|} \hline 1.316 \\ \hline 6.251 \\ \hline 2.303 \\ \hline -7.567 \\ \hline 10.528 \\ \hline ... \\ \hline 9.541 \\ \hline -23.030 \\ \hline \end{array} = \begin{array}{|c|} \hline -0.032 \\ \hline -1.025 \\ \hline -0.430 \\ \hline 1.357 \\ \hline -0.753 \\ \hline ... \\ \hline -1.754 \\ \hline 2.103 \\ \hline \end{array}$$

$W_{original}$      $\nabla_W L_{image1}$      $W_{updated}$

FIG. 14

USER-CUSTOMIZED COMPUTER VISION EVENT DETECTION

BACKGROUND

Computer vision is a field of artificial intelligence that enables computers to perceive and understand visual input. Machine learning computer vision models can allow computers to detect and classify objects and/or other areas of interest appearing in image data and video data. Upon classification of a particular object and/or area-of-interest, computers may be used to react to the particular object and/or area-of-interest in a variety of defined ways.

BRIEF DESCRIPTION OF DRAWINGS

FIG. 10 depicts an example training operation that may be used during training of the classifier model of FIG. 9, in accordance with various aspects of the present disclosure.

FIG. 11 depicts an example of score calculation using a logistic regression classifier in accordance with various examples described herein.

FIG. 12 depicts an example of a loss function that may be used in accordance with an example implementation of a logistic regression classifier model.

FIG. 13 depicts an example calculation of a portion of the gradient based on calculated loss, in accordance with various examples of the present disclosure.

FIG. 14 depicts an example of a weight update iteration using the portion of the gradient calculated in FIG. 13, in accordance with various aspects of the present disclosure.

DETAILED DESCRIPTION

Figure 1:
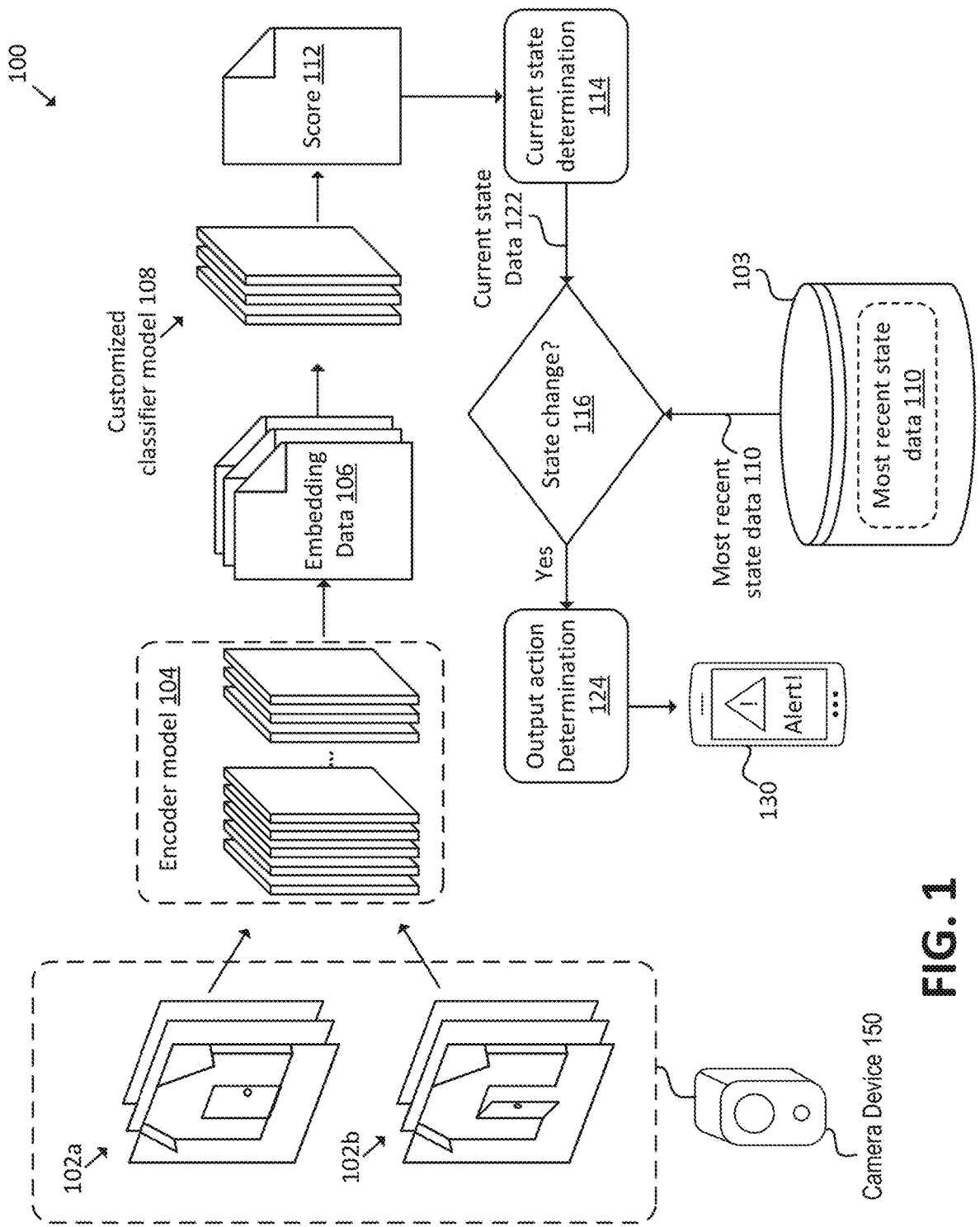
FIG. 1 is a diagram depicting an example system effective to provide user-customized computer vision event detection, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Described herein are systems, techniques, and interfaces that may be used for user-customized computer vision-based event detection. For example, a user may define two or more different states related to an event of interest with respect to image data captured by one or more camera devices. An example might be a camera device that monitors a tool shed in a user's back yard. A user may define an event as the tool shed door either opening or closing. Accordingly, a first state of this event may be the tool shed door being open. Accordingly, the first state may be defined using a plurality of user-provided images in which the tool shed door is depicted in the open state. Similarly, a second state of this event may be the tool shed door being closed. Accordingly, the second state may be defined using a plurality of user-provided images in which the tool shed door is depicted in the closed state.

A computer interface (e.g., provided by a mobile application and/or a companion application to a camera device) is provided whereby a user can define custom events that have two or more states, as in the example provided above. As described in further detail below, the interface may describe various actions that the user takes in order to provide customized event detection using computer vision. For example, the interface may walk the user through naming the event, naming the individual states that define the event, and capturing and/or uploading multiple images representative each state of the event. Further, the interface may control other systems that may evaluate the user-provided data to determine whether it is sufficient to provide the customized event detection and may provide feedback to the user regarding the same. The interface may allow the user to customize the resultant action that occurs when a customized event is detected (e.g., when the tool shed door has transitioned from a closed to open state, or vice versa). Various examples of such computer interfaces and their functionality are described in further detail below.

In response to receipt of a request to generate a customized event trigger and to monitor for the occurrence of the customized event (as discussed above), the interface may cause a computer-vision based event detection system to be instantiated in response to the request. The computer-vision based event detection system may be executed wholly or in part by the camera device, by one or more computing devices located remotely with respect to the camera device, and/or by some combination thereof. The computer-vision based event detection system may include a first machine learning model that is used to encode input image data (e.g., received from and/or generated by the relevant camera device) to generate respective embedding data that represents each input frame of image data. The embedding data representing each input frame may be used by a second machine learning model. The second machine learning model may be trained using the user-provided images to classify each input frame as corresponding to one of the user-defined states of the event (e.g., tool_shed_door=open or tool_shed_door=closed). Accordingly, the second machine learning model may be a custom model for an individual event defined by an individual user. The second machine learning model may be associated with the camera device and/or the user in some way. For example, the second machine learning model may be associated with account data of the user and/or of the camera device. In some examples, the second machine learning model may be looked up from storage using the account data and/or other identifier data associated with the camera device.

The second machine learning model may classify a given image embedding as pertaining to a particular state of the user-defined event (e.g., using a score and a tunable threshold score). The determined state may be stored in memory. In some cases, the second machine learning model may determine a state using a plurality of input frames of image data (e.g., by averaging the score generated by the second machine learning model for the plurality of input frames (e.g., 5 consecutive frames of a video, 10 consecutive frames of a video, etc.) and by comparing the average score to the tunable threshold). Thereafter, when a current state is determined using the most recent frames evaluated by the second machine learning model, the current state may be compared to the most-recently generated state (stored in memory) to determine if a state change has occurred (e.g., if the tool shed door has transitioned from the closed state to the open state). If a state change has occurred, a user-defined action may be taken. For example, a user may provide instructions through the interface such that when the state changes from tool_shed_door=closed to tool_shed_door=open, an alert is generated and is sent to the user via short message service (SMS) message. In another example, the user may provide a different set of instructions through the interface such that when the state changes from tool_shed_door=open to tool_shed_door=closed an in-app alert is generated, but no SMS message is sent (as the user may be more concerned with the tool shed door being opened than the tool shed door being closed). In some examples, the threshold used to distinguish between the different user-defined states may be empirically determined and/or may be tunable through the interface to reduce false positive event detection triggers. In a least some examples, the custom machine learning model (e.g., the second machine learning model in the foregoing examples) may be a relatively lightweight model (in terms of the number of required parameters) such that the model can be quickly deployed for each different user and/or user-defined custom event and to minimize compute resource consumption. Additionally, lightweight models may be able to be deployed on edge devices, whereas more resource intensive models may require data center-level compute resources. For example, the custom machine learning model(s) may be implemented as logistic regression models, perceptrons (or other relatively shallow neural networks) light tree-based models (e.g., LightGBM), etc.

Machine learning techniques, such as those described herein, may be used to form predictions, solve problems, recognize objects in image data for classification, etc. For example, machine learning techniques may be used to detect objects represented in image data and/or translate text from one spoken language to another. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models are machine learning models that typically include an encoder network and a decoder network. The encoder takes an input and generates feature representations (e.g., feature vectors, feature maps, etc.) of the input. The feature representation may then fed into a decoder that may generate output embedding data based on the encodings. For example, in natural language processing, transformer models take sequences of words as input. A transformer may receive a sentence and/or a paragraph comprising a sequence of words as an input. In some examples, a transformer may receive a time series of data captured at various different times (e.g., frames of a video) as input. In various examples described herein, a vision transformer (e.g., ViT) may receive frames of two-dimensional image data (e.g., from video) as input and may encode the input data into a numerical vector (e.g., embedding data).

The encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. For example, for an input image the encoder layers may determine which parts of the image are relevant to other parts of the image (and/or, in some cases, to other images received as part of the input data). Each encoder layer passes its token output to the next encoder layer. The decoder network takes the tokens output by the encoder network and processes them using the encoded contextual information to generate an output (e.g., the aforementioned one-dimensional vector of tokens). The output data may be used to perform task-specific functions (e.g., object detection, velocity prediction, the next word in a sentence, etc.). To encode contextual information from other inputs (e.g., combined feature representation), each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight $a_{ij}$ from token is the dot product between $q_i$ and $k_j$. The attention weights are divided by the square root of the dimension of the key vectors, $\sqrt{d_k}$, which stabilizes gradients during training, and passed through a softmax layer that normalizes the weights to sum to. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of ($W_Q$, $W_K$, $W_V$) matrices may be referred to as an attention head, and each layer in a transformer model may have multiple attention heads. While one attention head attends to the other tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information (e.g., macroblock locations in the context of image data) and embeddings of the input data as its input, rather than encodings. The position information is used by the transformer to make use of the order of the input data. In various examples described herein, the position embedding may describe a spatial relationship of a plurality of tokens relative to other tokens. For example, an input token may represent a 16×16 block of pixels from an input frame of image data. The position embedding may describe a location within the frame of the 16×16 block of pixels (e.g., relative to other tokens representing other portions of the frame). Accordingly, rather than a one-dimensional position embedding (as in the natural language context wherein the position of a word in a one-dimensional sentence/paragraph/document is defined), the various techniques described herein describe two-dimensional and/or higher-dimensional position embeddings that describe the spatial location of a token within the input data (e.g., a two-dimensional position within a frame, a three-dimensional position within a point cloud, etc.) and/or the temporal location of the token (e.g., a timestamp and/or frame number within a video). In various examples, the first encoder may learn a position embedding for each token in a frame of input data (e.g., 2D input data and/or 3D input data), and a position embedding for each timestamp (e.g., a temporal position of the token when the input data is time series data such as video and/or frames of image data captured over time). The sum of the position embedding and the timestamp may then be used to generate an embedding representing the token's position and temporal information.

Each decoder layer comprises three components: a self-attention mechanism (e.g., scaled dot product attention, an attention mechanism over the encodings, and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in this case, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

In some examples described herein, a pre-trained Vision Transformer (e.g., ViT as described in "*An Image is Worth 16×16 Words: Transformers for Image Recognition at*

*Scale*" Dosovitskiy et al.; https://arxiv.org/abs/2010.11929) and/or another image-based transformer may be used to generate embeddings representing one or more frames of input image data. As described in further detail below, the resulting embeddings may be used to determine whether or not a particular user-defined event has occurred over time, where the event is represented by input images. In some examples discussed herein, a transformer-based encoder is used to generate embedding data representing frames of image data. However, it should be noted that other image encoders may instead be used. For example, a neural network model such as a convolutional neural network (CNN), a pre-trained CNN, a pre-trained neural network, a pre-trained graph neural network model, a pre-trained capsule neural network model, a pre-trained support vector machine model, a pre-trained model utilizing vision transformation and/or convolution, and/or some other image encoder network may instead be used to generate embedding data that represents input images. In some examples, lighter-weight models such as CNNs may be advantageous when deployment of such models on edge devices is desired. However, embedding data generated using transformer-based models may include richer semantic information and may thus offer enhanced capability for downstream actions.

FIG. 1 is a diagram depicting an example system 100 effective to provide user-customized computer vision event detection, in accordance with various aspects of the present disclosure. In the example depicted in FIG. 1, a camera device 150 may have a field-of-view that covers an area-of-interest to a particular user. In the example of FIG. 1, camera device 150 generates image data 102a, 102b which depicts a garage (as the camera device 150 captures images of a physical environment including the garage). The garage may be an area-of-interest to the user. Accordingly, the user may have created a custom event (e.g., using an interface provided by a companion application executed by user device 130). The companion application may be associated with the camera device 150. In various examples, the user may create a secure account associating the user device 130 and camera device 150. In at least some examples, the companion application may enable the user to view images captured by the camera device 150, such as the image data 102a, 102b.

As described in further detail below, the user may create a custom event using an interface of the companion application executing on user device 130 (or on another network-connected computing device). In various examples, the custom event may determine whether image data captured by camera device 150 represents a user-defined state change. As described in further detail below, the user may generate a first plurality of images (e.g., a first plurality of frames of image data) representing a first state related to the custom event. In the current example, the first state may be a state in which the garage door is open (as shown in image data 102b). Additionally, the user may generate a second plurality of images (e.g., a second plurality of frames of image data) representing a second state related to the custom event. In the current example, the second state may be a state in which the garage door is closed (as shown in image data 102a). Although the particular example shown and described in reference to FIG. 1 describes two states, more states may be used depending on the particular custom event being created.

As described in further detail below, customized classifier model 108 may be a machine learning model trained based at least in part on images representing each state of the custom event. For example, a pre-trained encoder model 104 (e.g., ViT, a CNN, or any other model that generates embedding data representing an image) may be used to generate embedding data (e.g., a feature map, a vector, etc.) representing an input image. The input image and/or the embedding data representing the input image may be labeled with data identifying the corresponding state represented by the image (e.g., Garage door open or garage door closed). For example, the companion application may prompt the user (through a user interface) for a set of images (e.g., 5 images, 10 images, 2 images, etc.) having the first user-defined state. The user may provide the images that correspond to the first user-defined state (e.g., garage door open). Similarly, the companion application may prompt the user (via a user interface) for images corresponding to the second user-defined state and/or for each other state of the custom event.

The customized classifier model 108 may be trained in a supervised manner using a dataset of such labeled images/embeddings to classify input images according to the state represented in the image. For example, if customize classifier model 108 is implemented as a logistic regression classifier, State_A (garage door closed) may be assigned a ground truth value of 1 while State_B (garage door opened) may be assigned a ground truth value of 0. For a given input image, encoder model 104 may generate embedding data 106 (e.g., a column vector) representing the image. The embedding data 106 may be input to the linear regression model and the linear regression model may generate a score 112. In general, in the current example, if the score is closer to 1 the input image may be classified as State A, while the score being closer to 0 may result in the input image being classified as State B (at action 114). In some cases, an F1 optimal threshold score (or another threshold score) may be determined and used by action 114 to classify the state of the input image based on score 112. In some examples, multiple thresholds may be used. For example, a first threshold (e.g., a "high" threshold) may be used to determine if an input image represents a first state (e.g., if the score 112 for the input image is higher than the high threshold), while a second threshold (e.g., a "low" threshold) may be used to determine if the input image represents the second state (e.g., if the score 112 for the input image is lower than the low threshold). In some examples, respective thresholds may be defined for each state, while in other cases, thresholds may define score partitions between different states. Many different thresholding techniques are possible and may be used in accordance with the desired implementation. In various examples, the customized classifier model 108 may be implemented as a logistic regression model, a neural network model such as a convolutional neural network classifier model, a graph neural network model, a graph convolutional neural network model, a support vector machine model, a vision transformer model, and/or another classifier model.

After training the customized classifier model 108 the system 100 may be effective to detect a custom event based on a change in the state of the area-of-interest. In an example, input image data 102a may represent a plurality of frames of image data which depicts the garage door (the area-of-interest for the custom event at issue) as being closed. Input image data 102a may be frames of a video captured over a predetermined amount of time (e.g., 5 minutes, 30 seconds, 1 hour, etc.). In some examples, prior to input into encoder model 104 input image data 102a may be preprocessed. For example, the area-of-interest (e.g., the garage door) may be cropped from the background to generated cropped image data. For example, during set up of the custom event trigger, the user may be able to define an area-of-interest within the image frame. For example, the user may select the area-of-interest by moving vertices and/or adjusting sides of a polygon so that the polygon covers the area-of-interest within a sample frame. Thereafter, each input image data 102a, 102b may be cropped to generate cropped image data depicting the user-defined area-of-interest prior to input into the encoder model 104.

After preprocessing, the input image data 102a may be input into the encoder model 104. The encoder model 104 may generate embedding data 106 for each input frame of image data. The embedding data 106 may be, for example, a vector representing a given frame of the input image data 102a. Embedding data 106 may be input into the customized classifier model 108. As previously described, the customized classifier model 108 may be trained to generate a score 112 for each input embedding (e.g., embedding data 106). The score 112 may be used to classify each frame according to one of the user-defined states. For example, the score 112 may be compared to a threshold score. In the current example, if the score 112 is above the threshold score at action 114 a determination may be made that the current state of the input image corresponds to the garage door being shut. In various examples, scores 112 may be generated for each image of a set of images (e.g., for five frames of image data or some other number, depending on the desired implementation). An average of the scores 112 may be determined and the average score may be compared to the threshold at action 114 to determine the state represented by the set of images. In either case, the current state data 122 may represent the current state predicted by the customized classifier model 108 for the input image data 102a.

At action 116, a determination may be made whether a state change has occurred between the current state (represented by current state data 122) and a most recent state predicted by the customized classifier model. In an example, input image data 102a may be the initial input images after customized classifier model 108 has been trained to detect the user-defined event. Accordingly, there may not yet be any historical state data stored in the non-transitory computer-readable memory 103. In the example, the current state data 122 (indicating that the garage door is closed) may be stored in the non-transitory computer-readable memory 103 as the most recent state data 110 (e.g., prior state data determined at a previous time step).

Input image data 102b may depict the garage door as opened and may be captured after input image data 102a (e.g., after the garage door has been opened). Image data 102b may be preprocessed (e.g., the area-of-interest may be cropped from the input image data 102b to generate cropped image data) and may be input into the encoder model 104 to generate respective embedding data 106 for each frame of the input image data 102b. The embedding data 106 may be input into the customized classifier model 108. The customized classifier model 108 may generate a score 112 for each input embedding. The scores 112 may be averaged and compared to the relevant threshold score (at action 114). A determination may be made that the new current state data 122 is the garage_door_open state. At action 116, the most recent state data 110 determined at a most recent time step (representing the garage door closed state determined for input image data 102a) may be retrieved from non-transitory computer-readable memory 103 and compared to the current state data 122 (indicating the garage_door_opened state). Accordingly, a determination may be made at action 116 that the state has changed from the garage_door_closed state to the garage_door_open state.

At action 124, there may be an action associated with this state change for the user-defined event. For example, a user may have provided instructions that when an event is detected indicating that the garage door has transitioned from the closed state to the open state, that an alert should be pushed to the user's user device 130. Accordingly, in the example of FIG. 1, an alert is shown on user device 130. It should be noted that different output actions may be configured for different state changes. For example, if there are three relevant states A, B, and C there may be different output actions for a state change from state A to state B, from state B to state C, from state A to state C, from state C to state A, from state B to state A, and/or from state C to state B. For example, some output actions may be in-app alerts, while others may use push notifications, SMS messages, emails, etc.

In some examples, the system 100 depicted in FIG. 1 may be configured via the mobile application to detect the state at a user-defined cadence. For example, the user may instruct the system to monitor for a state change each minute, every 5 minutes, every hour, every 10 seconds, etc. In some cases, a default cadence may be used if the user does not specify a particular frequency for state change detection. When it is time to detect a state change, the camera device 150 may capture and send a predefined number of frames of image data to the system for state classification and state change detection, as described herein.

It should be noted that the example custom event and user-defined states related to the garage door are merely illustrative examples. The user may define custom events for a wide variety of event triggers. For example, the custom event may alert the user when a car enters or leaves the user's driveway (with a first state showing at least some portion of a vehicle in the driveway and the second state showing an empty driveway). Other examples may include a cover being removed or added to a swimming pool, a bicycle being removed from an area-of-interest, a garbage bin being removed from an area-of-interest, etc. In various examples, the system 100 may prevent the user from tracking people and may reject any training images and/or user defined states that include images of people (or animals) for privacy reasons. In some cases, any training images that include humans, cars, and/or any other prohibited class may be detected and prohibited to prevent generation of customized events that track such entities (for privacy reasons).

Figure 2:
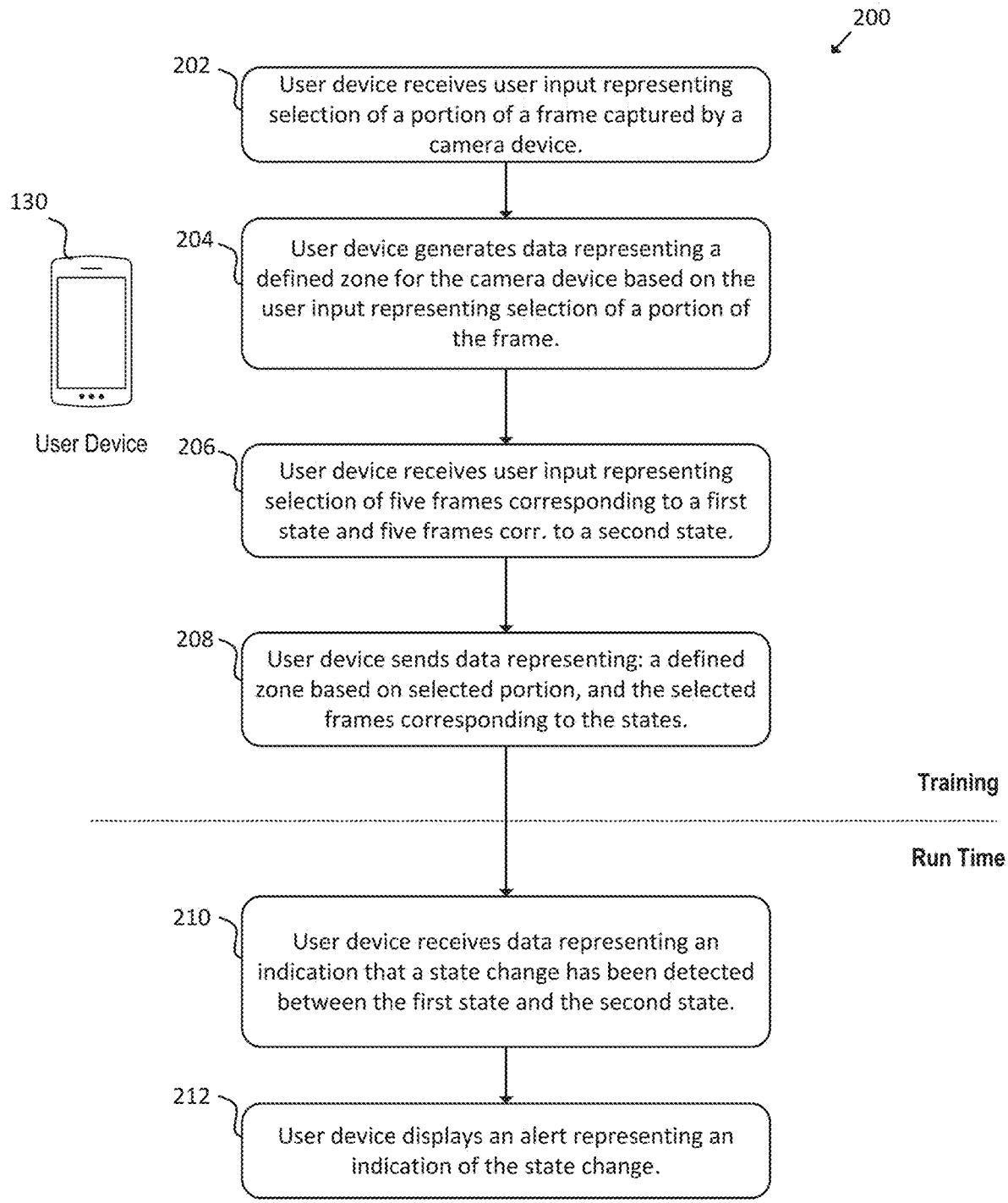
FIG. 2 depicts an example process for training and runtime operations for the system described in FIG. 1, in accordance with various aspects of the present disclosure.

FIG. 2 depicts an example process 200 for training and runtime operations for the system 100 performed by user device 130, in accordance with various aspects of the present disclosure. Those actions in FIG. 2 that have been previously described in reference to FIG. 1 may not be described again herein for purposes of clarity and brevity. The actions of the process depicted in the flow diagram of FIG. 2 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Figure 3:
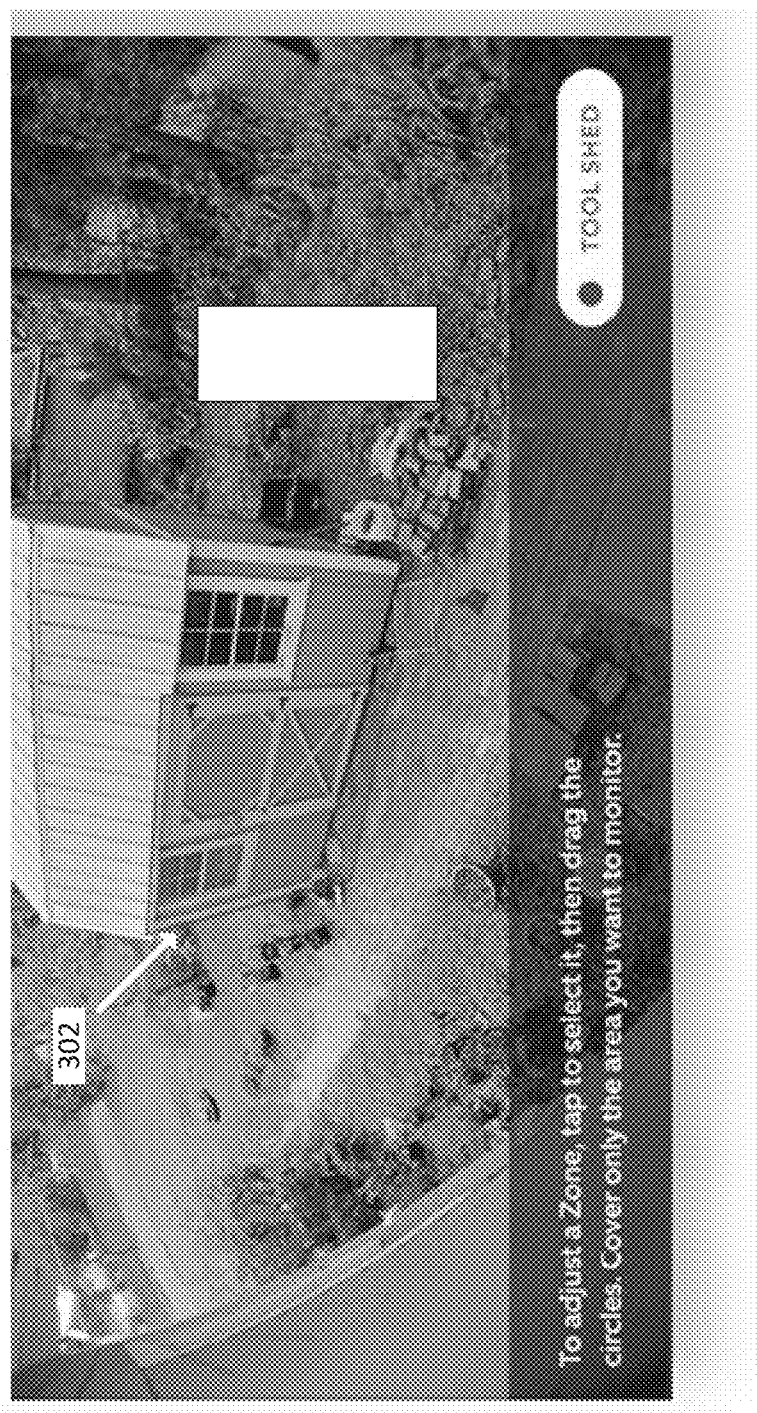
FIG. 3 depicts an example of a user-defined area-of-interest in a frame of image data, in accordance with various aspects of the present disclosure.

Process 200 may begin at action 202, at which the user device 130 may receive user input representing a selection of a portion of a frame captured by a camera device (e.g., camera device 150). For example, a user may define the area-of-interest within the frame by dragging vertices of a polygon so that the polygon surrounds the area-of-interest for the user-defined custom event. For example, FIG. 3 depicts a selection of a user of an area-of-interest 302 (e.g., a tool shed door) in a frame of image data. As shown in FIG. 3, the companion application may display instructions for adjusting the area-of-interest to cover the area that the user would like monitored for purposes of custom event detection.

Process 200 may continue at action 204, at which the user device 130 generates data representing a defined zone (e.g., the area-of-interest) for the camera device 150 based on the user input representing selection of a portion of the frame. For example, the data may represent the area-of-interest (e.g., the garage door) that may be detected and/or cropped from subsequently captured frames.

Figure 4B:
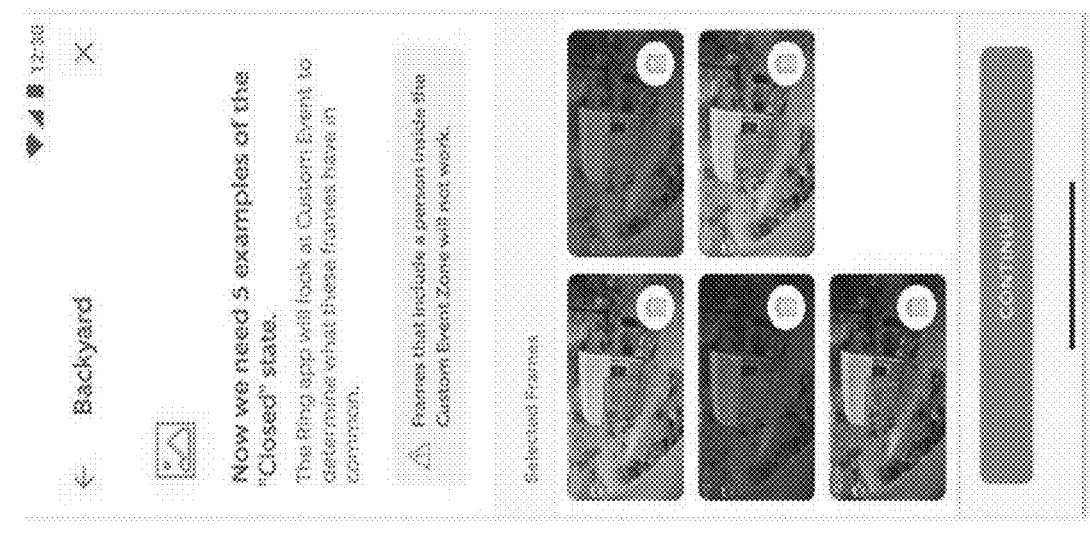
FIGS. 4A and 4B depict, respectively, a first example interfaces enabling a user to name a user-defined state and a second example interface for selecting image data corresponding to a user-defined state, in accordance with various aspects of the present disclosure.
Figure 4A:
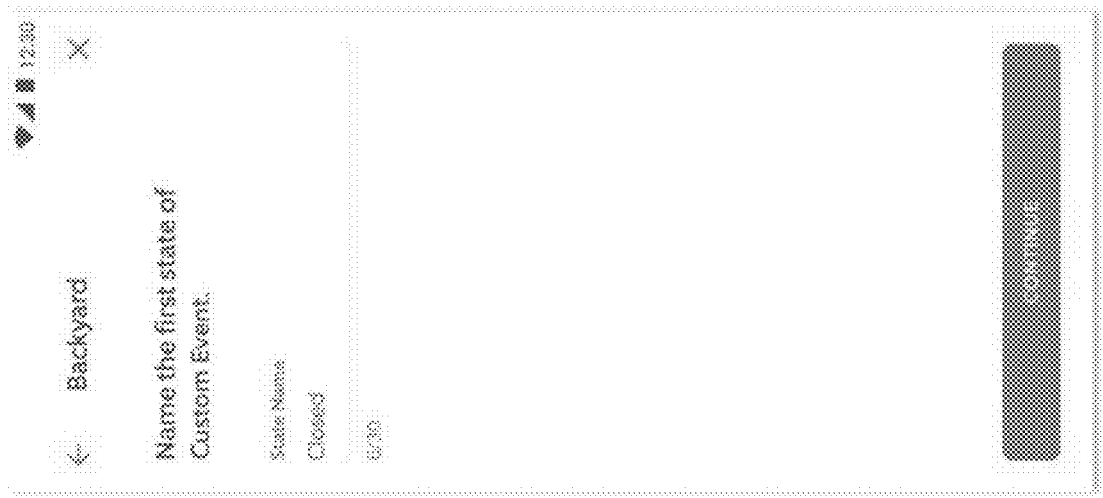

Process 200 may continue at action 206, at which the user device 130 receives user input representing a selection of five frames corresponding to a first state and five frames corresponding to a second state. For example, the companion application of the user device 130 and/or the camera device 150 may prompt the user for five images (or some other number of images, depending on the implementation) of each state that defines the custom event. The images may be selected from among images captured by the camera device 150 and/or available for viewing through the companion application executing at least in part on the user device 130. The user may select five images that are typical of each user-defined state. For example, five images showing the garage door in a closed state may be selected and may be labeled as "Garage Door Closed." Similarly, five images showing the garage door in an open state may be selected and may be labeled (through the companion application) as "Garage Door Opened." For example, as shown in FIG. 4A, the companion application may provide a field to allow the user to name each state of a custom event. As shown in FIG. 4B, the companion application may display previews (e.g., thumbnails) of the user-provided frames that are representative of the first state. The user can optionally delete any of the frames and select new ones. In some examples, the frames may be selected through the companion application during the setup process for custom event detection.

Returning to FIG. 2, processing may continue at action 208, at which the user device 130 sends data representing a defined zone (e.g., the data representing the area-of-interest) based on the selected portion, and the selected frames corresponding to the user-defined states. For example, the data may be sent to one or more computing devices of system 100 (e.g., computing devices implementing the encoder model 104, the customized classifier model 108, and/or logic related to the various operations of system 100 described herein. As previously described, the customized classifier model 108 may be trained based at least in part on the selected frames corresponding to the user-defined states to distinguish between the different user-defined states for a given input frame of image data depicting the area-of-interest.

Actions 210 and 212 represent runtime actions that may be performed once the encoder model 104 is trained based at least in part on the user-supplied images representative of the user-defined states. At action 210, the user device 130 may receive data representing an indication that a state change has been detected between the first state and the second state. For example, system 100 may determine that a current frame of image data and/or a set of current frames of image data represent a second user-defined state. However, the system 100 may determine that at the most-recent time step prior to the current time step, that the area-of-interest was in the first user-defined state. Accordingly, the area-of-interest has transitioned between the first state and the second state.

At action 212, the user device 130 may take a particular action in response to the detected state change. The action may be a user defined action, such as displaying an alert representing an indication of the state change. For example, the alert may be a push notification reading "The swimming pool gate has been opened."

Figure 5:
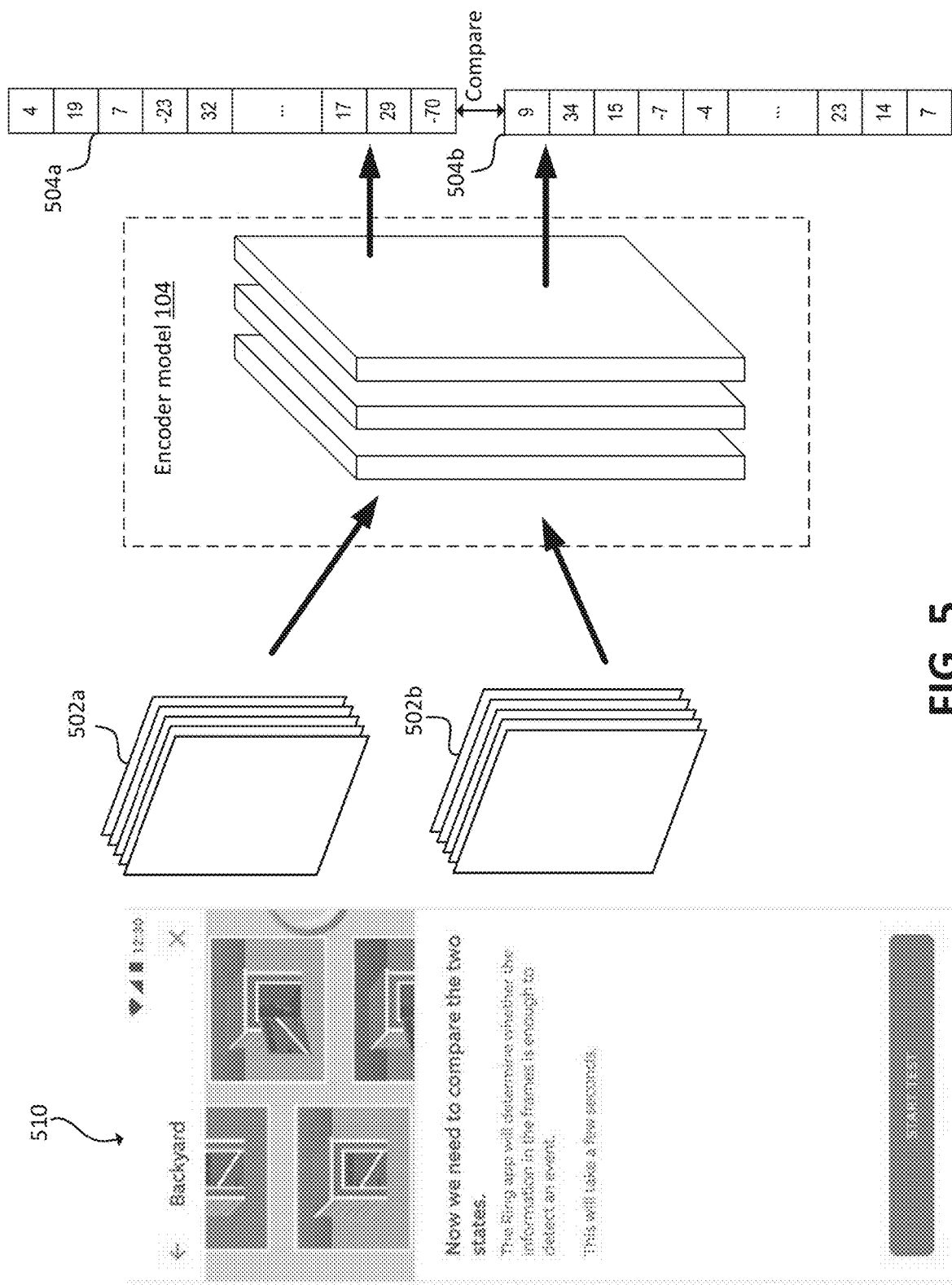
FIG. 5 depicts an example evaluation of training images to determine if training should continue, in accordance with various aspects of the present disclosure.

FIG. 5 depicts an example evaluation of training images to determine if training should continue, in accordance with various aspects of the present disclosure. As described in the example user interface 510 of the companion application a determination may be made whether the images that the user provided representing each user-defined state of the custom event are sufficient to train the customized classifier model 108 (FIG. 1).

In the example depicted in FIG. 5, the input frames 502a may be the user-provided images representing the first state while the input frames 502b may be the user-provided images representing the second state. The input frames 502a and 502b may be input into the encoder model 104 and the encoder model 104 may generate embedding data 504a representing input frames 502a and embedding data 504b representing input frames 502b. For example, individual embeddings may be generated for each frame of the input frames 502a and the embedding data 504a may be an average of these embeddings (e.g., an average value for each element of the vector). Similarly, embedding data 504b may represent an average of the embeddings generated for the individual input frames 502b.

The system 100 may evaluate the input frames 502a and input frames 502b to determine if they are sufficient to proceed with training the customized classifier model 108. The evaluation is based on two underlying principles. First, individual images among the user-provided images representative of a single user-defined state should be similar to one another. Accordingly, each frame of the input frames 502a should be similar to one another, as they each are purported to represent the same user-defined state. Various techniques may be used to determine the similarity between individual embeddings for the input frames. For example, cosine similarity may be determined and/or the standard deviation of values from mean values may be determined. Similarity thresholds may be used to ensure that the frames within input frames 502a are sufficiently similar to one another and that the frames within input frames 502b are sufficiently similar to one another. Second, the images representing one state (e.g., input frames 502a) should be sufficiently different from the images representing another state (e.g., input frames 502b). Accordingly, the embedding data 504a may be compared to the embedding data 504b to ensure that there is sufficient distance between the embedding vectors (e.g., greater than a threshold Euclidean distance and/or less than a threshold cosine similarity).

In some examples, if the intra-frame similarity between the user-provided frames corresponding to a single user-defined state satisfies the relevant similarity threshold and the aggregated inter-frame difference between frames defined for different states satisfies the relevant difference threshold, training of the customized classifier model 108 may proceed. Otherwise, the user may be prompted for additional frames that satisfy the above-described criteria via the companion application.

Various other techniques may be used to determine if the user-provided frames may be used for training the customized classifier model 108. For example, classifier models (e.g., logistic regression models) may instead be used to determine if the training images are sufficient for training. For example, 10 images of a particular state may be received (e.g., via the companion application). Nine of the ten images may be used to train a classifier model (e.g., a logistic regression model). The state of the tenth image may be predicted using the trained model. This may be done any number of times (e.g., ten times) where each time a different image is held out of training for use in testing. If the test is successful (e.g., if a performance metric is met (e.g., confidence score greater than a threshold) for the training iterations, the image data may pass a comparison check and may be used for training the customized classifier model 108. If the test is unsuccessful (e.g., performance metric failed, such as when the average confidence score over the ten iterations is less than the threshold), the comparison check may fail and the user may be prompted for additional images of the state before training of the customized classifier model 108 proceeds. In addition, a check may be made to ensure that the training images do not violate any other rules prior to using such images for training the customized classifier model 108. For example, a check may be performed to determine if any humans, cars, or other prohibited objects are detected in the training images. If so, an appropriate alert may be displayed to alert the user that such items are not prohibited in the training images for the customized event detection. The alert may prompt the user to select other images representative of the one or more states of the customized event.

Figure 6A:
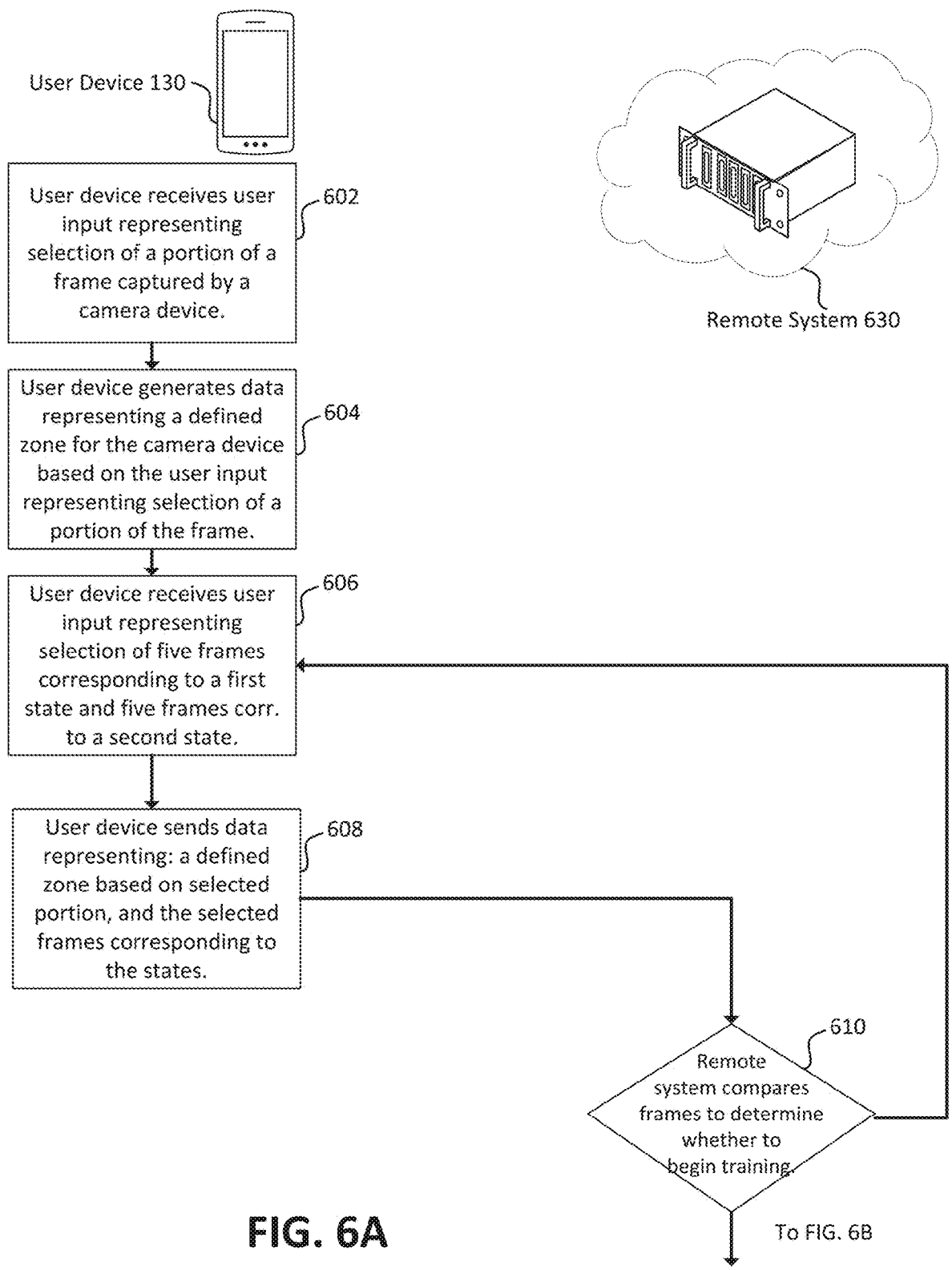
FIGS. 6A and 6B depict, respectively, an example training process that may be used to train a system to provide user-customized computer vision event detection, in accordance with various aspects of the present disclosure.
Figure 6B:
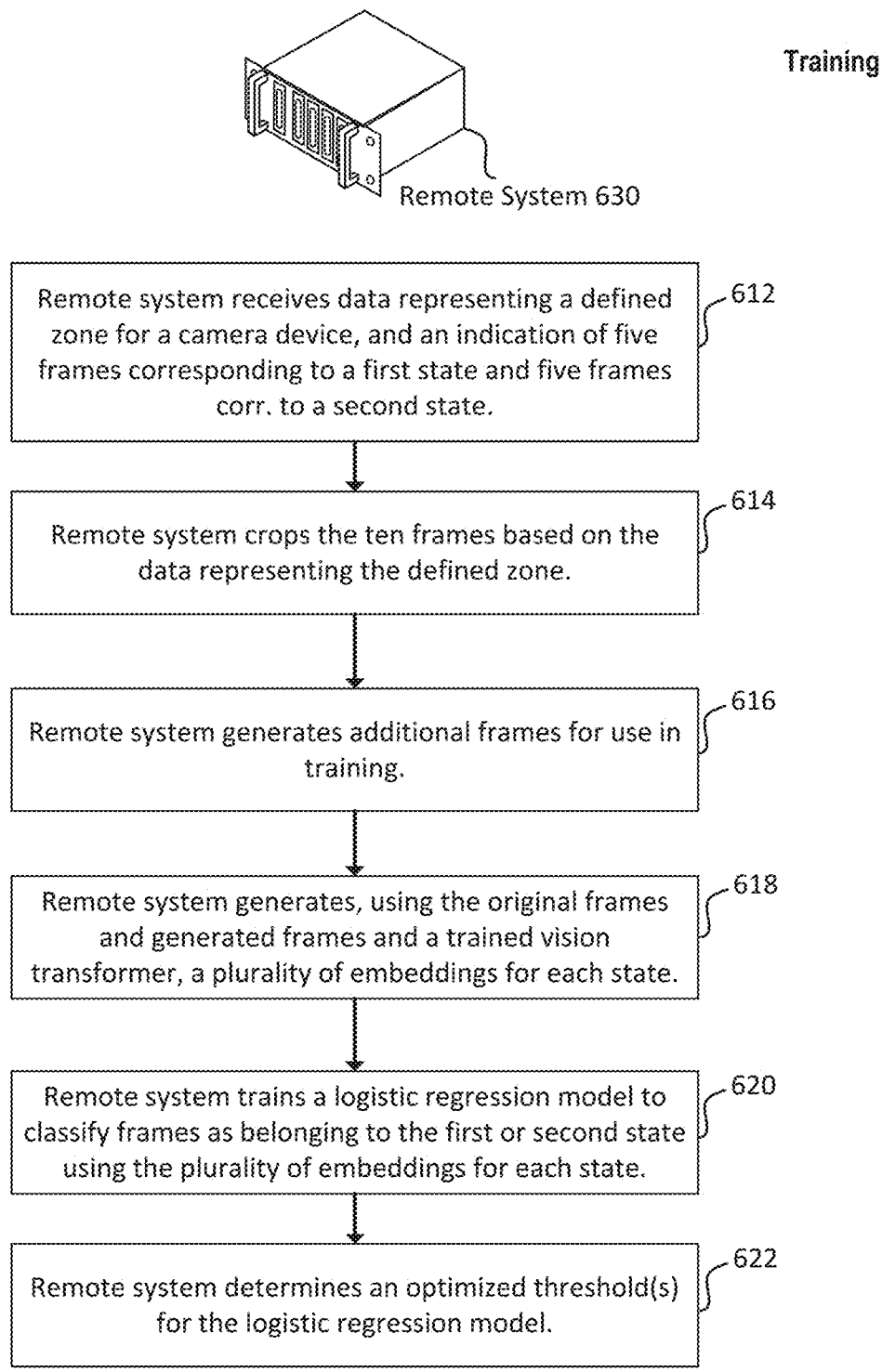

FIGS. 6A and 6B depict, respectively, an example training process that may be used to train a system to provide user-customized computer vision event detection, in accordance with various aspects of the present disclosure. Those actions in FIGS. 6A-6B that have been previously described in reference to FIGS. 1-5 may not be described again herein for purposes of clarity and brevity. The actions of the process depicted in the flow diagram of FIGS. 6A-6B may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure. As shown in FIGS. 6A, 6B, some actions (e.g., those blocks appearing under user device 130) may be performed by the user device 130, while other actions (e.g., those blocks appearing under remote system 630) may be performed by a system that is remote with respect to the user device 130 and/or the camera device 150.

Processing may begin at action 602 at which the user device 130 may receive user input representing a selection of a portion of a frame captured by a camera device 150. As previously described, the user may define an area-of-interest within a frame that defines an area to be monitored for a user-defined custom event. Processing may continue at action 604, at which the user device 130 may generate data representing a defined zone (e.g., the area-of-interest) for the camera device 150 based on the user input representing selection of a portion of the frame. For example, the data may represent the area-of-interest (e.g., the garage door) that may be detected and/or cropped from subsequently captured frames.

Processing may continue at action 606, at which the user device may receive user input representing selection of five frames corresponding to a first state and five frames corresponding to a second state. For example, the companion application of the user device 130 and/or the camera device 150 may prompt the user for five images (or some other number of images, depending on the implementation) of each state that defines the custom event. The images may be selected from among images captured by the camera device 150 and/or available for viewing through the companion application executing at least in part on the user device 130. The user may select five images that are typical of each user-defined state. For example, five images showing the garage door in a closed state may be selected and may be labeled as "Garage Door Closed." Similarly, five images showing the garage door in an open state may be selected and may be labeled (through the companion application) as "Garage Door Opened."

Processing may continue at action 608, at which the user device 130 sends data representing a defined zone (e.g., the data representing the area-of-interest) based on the selected portion, and the selected frames corresponding to the user-defined states to the remote system 630. In various examples, the remote system 630 may include one or more computing devices implementing the encoder model 104, the customized classifier model 108, and/or logic related to the various operations of system 100 described herein. As previously described, the customized classifier model 108 may be trained based at least in part on the selected frames corresponding to the user-defined states to distinguish between the different user-defined states for a given input frame of image data depicting the area-of-interest.

Processing may continue at action 610, at which the remote system may compare frames to determine whether to begin training. For example, the remote system 630 may compare frames corresponding to an individual state to one another to ensure similarity and may compare frames of different states to one another to ensure a sufficient degree of difference as described above in reference to FIG. 5. If training should not yet be begun (based on the frames defining a single state being too different and/or based on the frames between two different states being too similar) processing may return to action 606 and the user device 130 may indicate the problem and/or may prompt the user to select additional frames to correct the issue.

In accordance with one or more preferred implementations, a comparison process may involve, for each respective frame of a set of frames that have been provided by a user with an associated user-defined state (e.g. five frames associated with a first state and five frames associated with a second state), training a respective machine learning model (e.g. a logistic regression model) using the remaining frames of the set of frames, and then determining a state for the respective frame using the trained respective machine learning model (e.g. determining a score value and comparing it to a threshold (e.g. 0.5)), and then comparing the determined state to the state identified by the user as being associated with the respective frame (e.g. a label for the respective frame). The comparison process may involve doing this for each respective frame of the set of frames, and determining that the set of frames passes the comparison test if a threshold number of frames (e.g. ten of ten frames, or nine of ten frames, or eight of ten frames, etc.) result in a state determination that matches the label provided by the user.

Conversely, if a determination is made at action 610 that training should be begun, processing may continue to action 612 (FIG. 6B) at which remote system 630 may receive data representing the user-defined area-of-interest and the user-selected frames of image data representing each state of the custom event. Processing may continue at action 614, at which the remote system 630 may crop each of the received frames of images corresponding to the user-defined states according to the data defining the area-of-interest (e.g., the zone defined by the user as described above). After cropping, the frames of image data may be described as "cropped" frames of image data.

Processing may continue at action 616, at which the remote system 630 may use the cropped frames of image data to generate additional frames for use in training the customized classifier model 108. For example, if the user supplies five frames corresponding to a first state and five frames corresponding to a second state, the remote system may generate additional synthetic frames of image data corresponding to each state to generate a sufficient volume of training data to effectively train the customized classifier model 108. Various techniques are known for generating synthetic images for training machine learning models and any suitable technique may be used provided the synthetically-generated images for each state maintain the visual characteristics associated with the different states. For example, the input frames may be rotated, padded, color-augmented, and/or have other image modification techniques applied in order to generate additional synthetic training images.

Processing may continue at action 618, at which remote system 630 may generate, using the original user-selected frames for each user-defined state, a trained vision transformer (or other instantiation of encoder model 104), and a plurality of embeddings for each state. As described above, for a given frame of image data (including the cropped frames representing the area-of-interest) the encoder model 104 may generate embedding data representing that frame. In various examples, the encoder model 104 may be a pre-trained encoder model (e.g., pre-trained ViT).

Processing may continue at action 620, at which remote system 630 may train a logistic regression model (or other instantiation of the customized classifier model 108) to classify input frames as pertaining to the first state or the second state based on the input embedding data. For example, the logistic regression model or other instantiation of the customized classifier model 108 may receive embedding data representing an input frame of image data as input and may classify the embedding data (and, by extension, the input frame) as pertaining to the first state or the second state. As previously described, the logistic regression model (or other instantiation of the customized classifier model 108) may be trained in a supervised manner using the labeled training images provided by the user (as well as synthetic training images generated therefrom).

Processing may continue at action 622, at which the remote system 630 may determine an optimized threshold(s) for the logistic regression model. For example, an optimal F1 threshold may be determined for distinguishing between the first state and the second state. Thereafter, each score output by the logistic regression model may be compared with the optimized threshold score to classify the input image as pertaining to a particular state. As previously described, multiple thresholds may be used in accordance with the desired implementation. For example, a first threshold (e.g., a high threshold) may be used to detect a first state (e.g., if the score output by the customized classifier model 108 meets or exceeds the high threshold), while a second threshold (e.g., a low threshold) may be used to detect a second state (e.g., if the score output by the customized classifier model 108 is at or below the low threshold).

Figure 7:
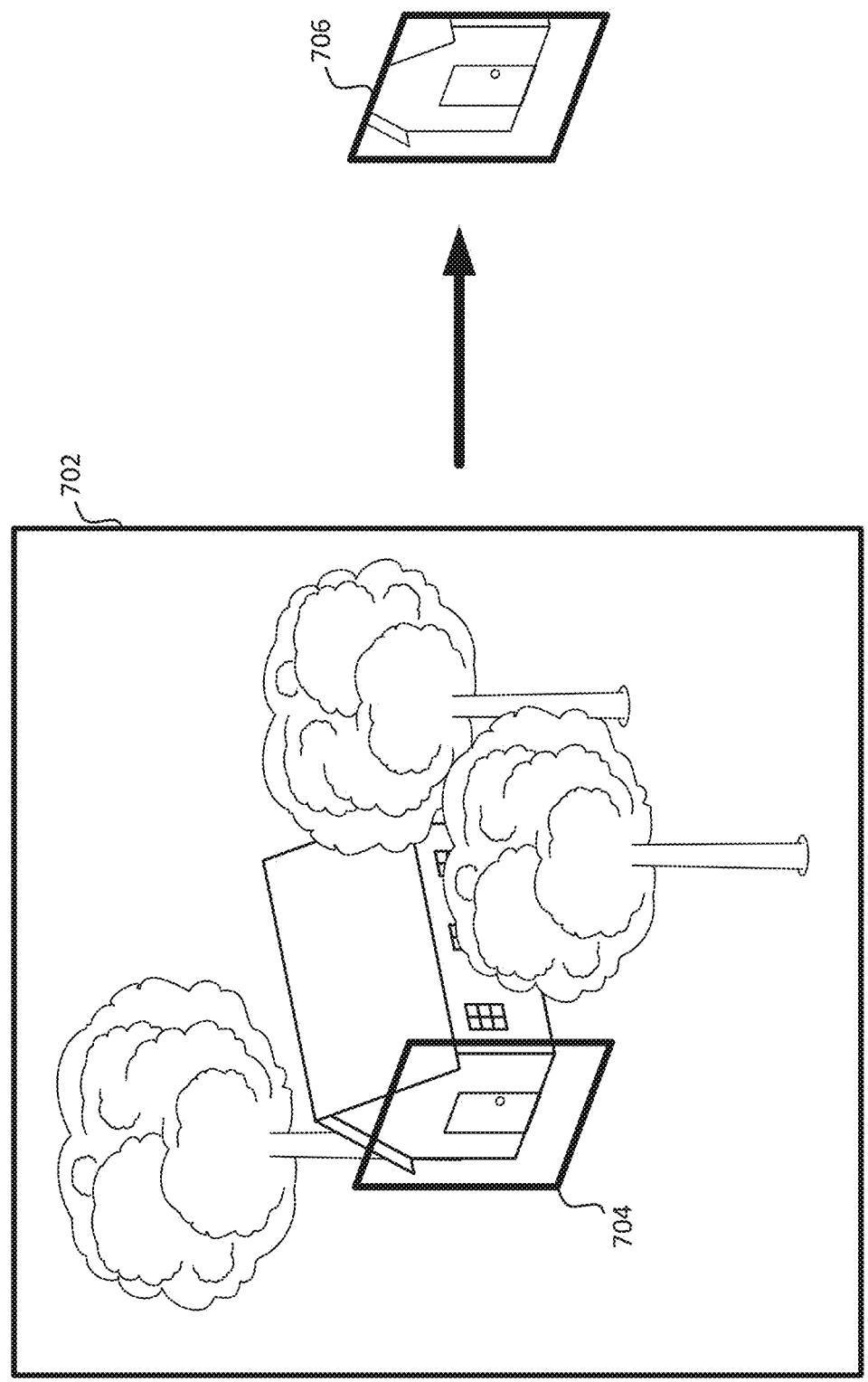
FIG. 7 represents a cropping operation used to generate a cropped frame of image data, in accordance with various aspects of the present disclosure.

FIG. 7 represents a cropping operation used to generate a cropped frame of image data, in accordance with various aspects of the present disclosure. For example, remote system 630 may receive an input frame 702 representing a house and trees. Remote system 630 may determine identifier data identifying a camera device 150 from which the input frame 702 was received. Remote system 630 may determine data representing an area-of-interest 704 (e.g., the polygon surrounding the door) associated with the identifier data. Remote system 630 may crop the input frame 702 to generate cropped image data 706 by removing image data apart from the image data within the area-of-interest 704.

Figure 8:
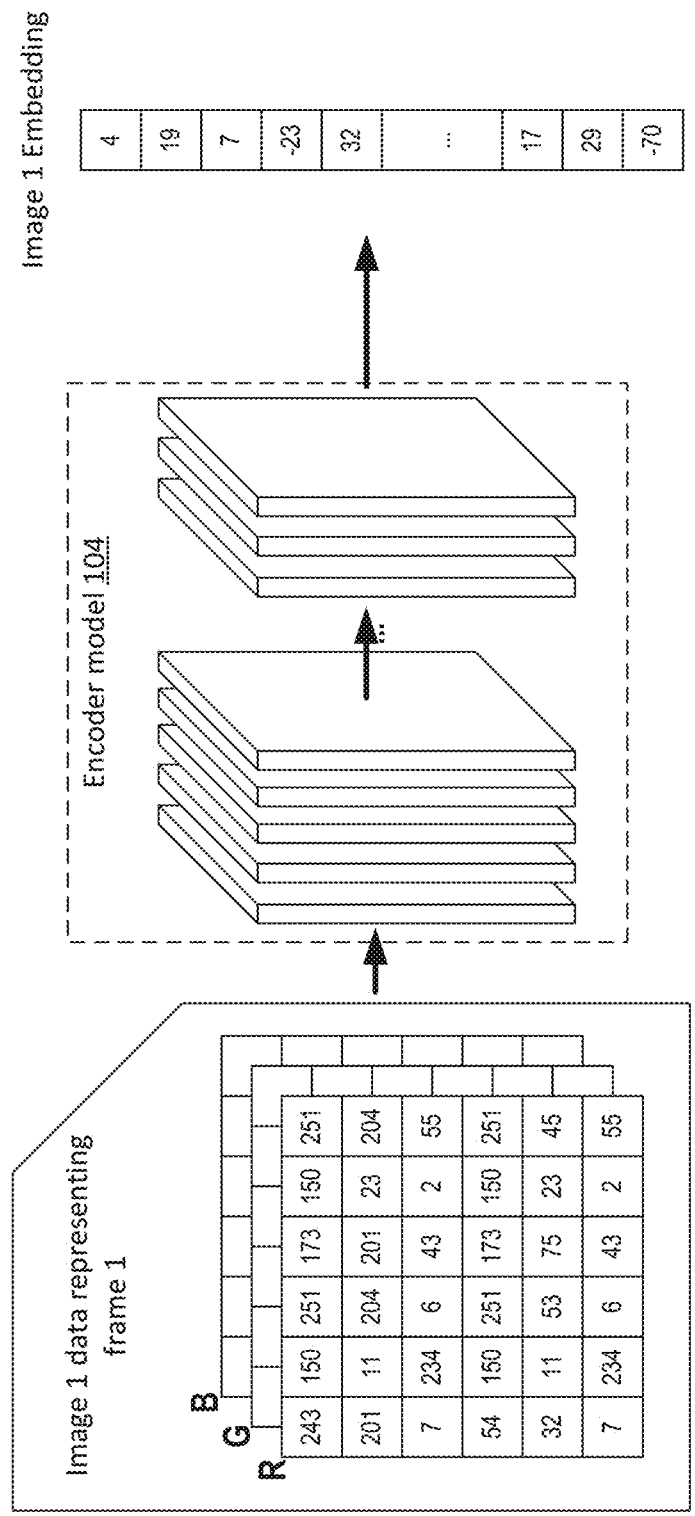
FIG. 8 depicts an example in which image data is input into an encoder model to generate embedding data representing the image data, in accordance with various aspects of the present disclosure.

FIG. 8 depicts an example in which image data is input into an encoder model to generate embedding data representing the image data, in accordance with various aspects of the present disclosure. As shown, the image data may include RGB pixel values for each pixel captured by the image sensor of the camera device 150. The encoder model 104 may be a trained model such as a trained ViT model, a trained CNN, and/or another model trained to generate vector embeddings (e.g., image 1 embedding) from the input image data (e.g., Image 1 data representing frame 1).

Figure 9:
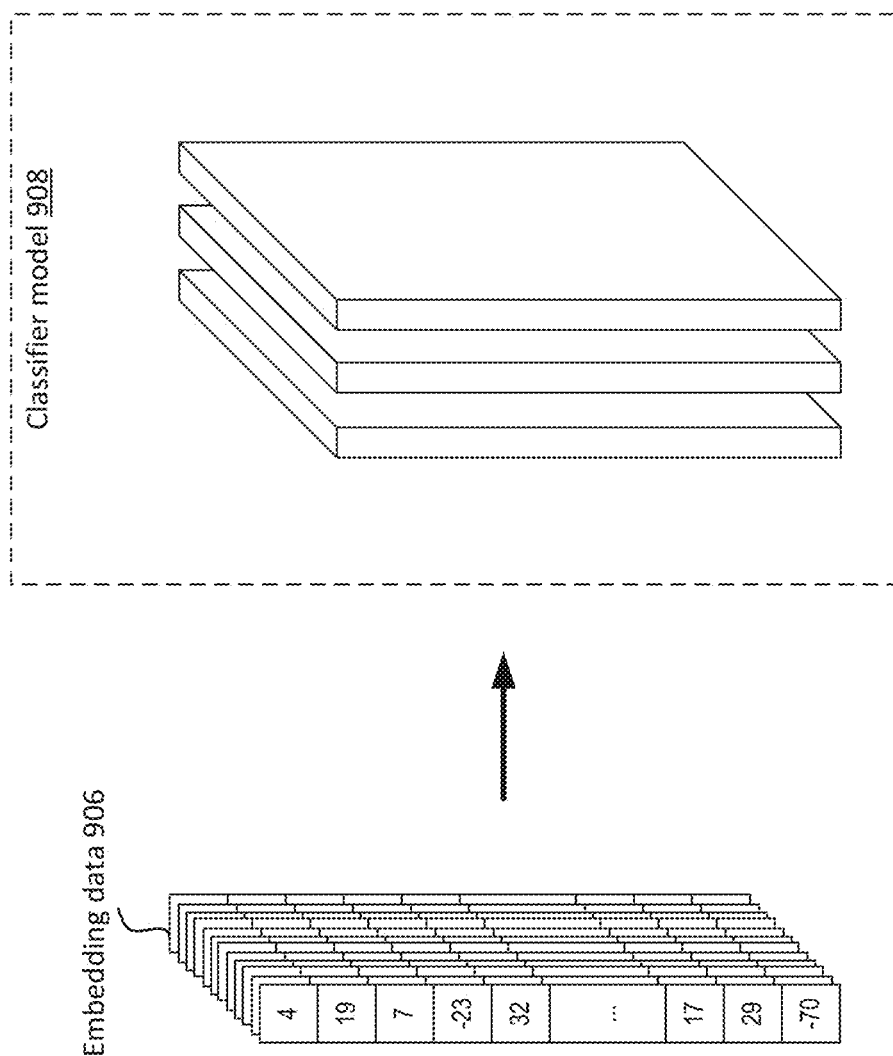
FIG. 9 depicts embedding data that may be used during training of a classifier model, in accordance with various aspects of the present disclosure.

FIG. 9 depicts embedding data 906 that may be used during training of a classifier model 908, in accordance with various aspects of the present disclosure. The classifier model 908 may be an untrained logistic regression model, neural network, and/or other machine learning model that may be used to classify input image data according to its class. As described in further detail below, each vector of the embedding data 906 may represent a respective input image. Each input image (and each corresponding embedding) may be labeled with data identifying the state pertaining to that image. For example, a first image showing the garage door in a closed state may be labeled with ground truth data indicating that the first image represents the garage door closed state. Accordingly, the embedding data representing the first image may correspondingly be labeled with the ground truth data identifying the state of the image. As described in further detail below, the labeled embedding data 906 may be used to train the classifier model 908. Since the labeled embedding data 906 corresponds to the user-provided image data representing the user-defined custom event, the classifier model 908 may be customized for the particular user's event and thus may be a user-specific and event-specific model (after training). After successful training a message or other confirmation data may be output by the user device indicating that the customized classifier model 908 has been successfully trained and/or that event detection between the first user-defined state and second user-defined state has been enabled. Optionally, the user may use the companion application to toggle the event detection between an active and an inactive state.

During training, each image embedding X may be input into the classifier model 908 as illustrated in FIG. 10 to generate a score 112. For example, the embedding data representing the input image (e.g., image1) may be a vector. The vector may be transposed as shown in FIG. to generate the row vector $X_{image1}^{T}$. Matrix multiplication may be used to multiply $X_{image1}^{T}$ by the weight vector including the parameters of the classifier model 908 (e.g., column vector W) to determine $X_{image1}^{T}*W$ (e.g., −0.712 for the example depicted in FIG. 10). The score 112 (for a logistic regression model instantiation of classifier model 908) may be determined using equation 1002:

$$\text{score} = \frac{1}{1 + e^{-(X^T * W)}}$$

In the example depicted in FIG. 11, the score 112 has been calculated as 0.329. FIG. 12 depicts an example of a loss function that may be used in accordance with an example implementation of a logistic regression classifier model. In the example, $y_{actual}$ represents a numeric representation of the ground truth state for each image, while $y_{prediction}$ represents the score predicted by the model. For example, for the garage_door_closed state, the ground truth score may be 0, while for the garage_door_opened state, the score should be 1. In the example of FIG. 11, the predicted score for image$_1$ is $0.329 = y_{predicted}$. The ground truth score for image$_1$ may be 0 (representing the garage_door_closed state).

FIG. 13 depicts an example calculation of a portion of the gradient using the loss determined from the loss function in FIG. 12 and the predicted score for image 1 calculated in FIG. 11. FIG. 14 depicts an example of a weight update iteration using the portion of the gradient calculated in FIG. 13, in accordance with various aspects of the present disclosure. The weight vector W may be updated as shown in FIG. 14. FIGS. 10-14 depict one training iteration, however, multiple training iterations may be used to iteratively update the weights of the classifier model 908 until the loss defined by the loss function in FIG. 12 is minimized. After training, the classifier model 908 may be customized for the user-defined event (e.g., resulting in an instantiation of customized classifier model 108. In various examples, a K-fold check may be used during model training. In such examples, a first predefined proportion or number of training images may be used to train the model while a second predefined proportion or number of training images may be reserved for testing the model.

Figure 15:
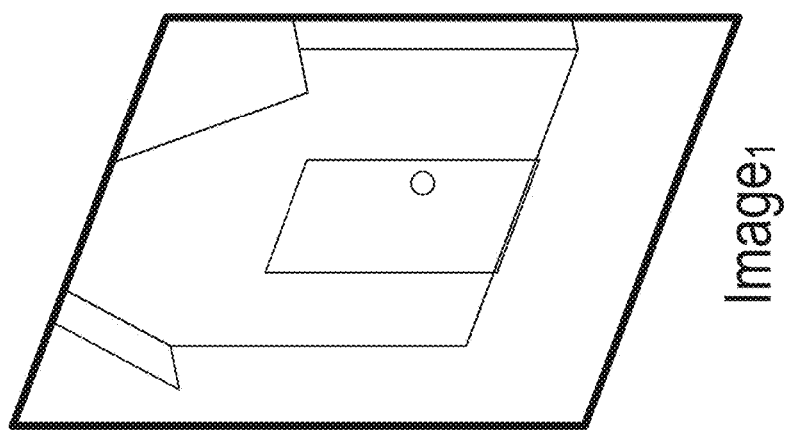
FIG. 15 depicts a state determination example using a trained classifier model, in accordance with various aspects of the present disclosure.

In FIG. 15, image$_1$ is input to the customized classifier model 108 (e.g., as test data after training the logistic regression classifier). The score for image$_1$, determined using the techniques described above, is 0.301 after training the customized classifier model 108. In the example of FIG. 15, the threshold score is 0.5. According to the example code 1502 in FIG. 15, if the score output by the customized classifier model 108 is less than or equal to the threshold score, custom state 0 is returned and if the score is greater than the threshold score, custom state 1 is returned. In the example of FIG. 15, the score is less than 0.5 accordingly custom state 0 (e.g., garage_door_closed) is returned. As shown in the representation of image$_1$ in FIG. 15, the garage door is closed. Accordingly, the customized classifier model 108 has predicted the correct user-defined state in the example of FIG. 15.

In various examples, after training, a plurality of scores may be generated using the training corpus (e.g., for cropped image data in the training corpus representing the user-defined area-of-interest). The scores may be used to determine an optimized threshold score. For example, an initial threshold score may be 0.5. For a first state, the optimized threshold score (e.g., the F1 score) may be determined using:

Precision=TruePositives/(TruePositives+FalsePositives)

Recall=TruePositives/(TruePositives+FalseNegatives)

F1Score=(2*Precision*Recall)/(Precision+Recall)

where a true positive is a score/image that is predicted to have the first state and which does have the first state (as determined using ground truth data), a false positive is a score/image that is predicted to have the first state, but which does not have the first state, and a false negative is a score/image that is predicted to not have the first state, but which does have the first state. In some examples, there may be separate thresholds for each user-defined state of the custom event.

Figure 16:
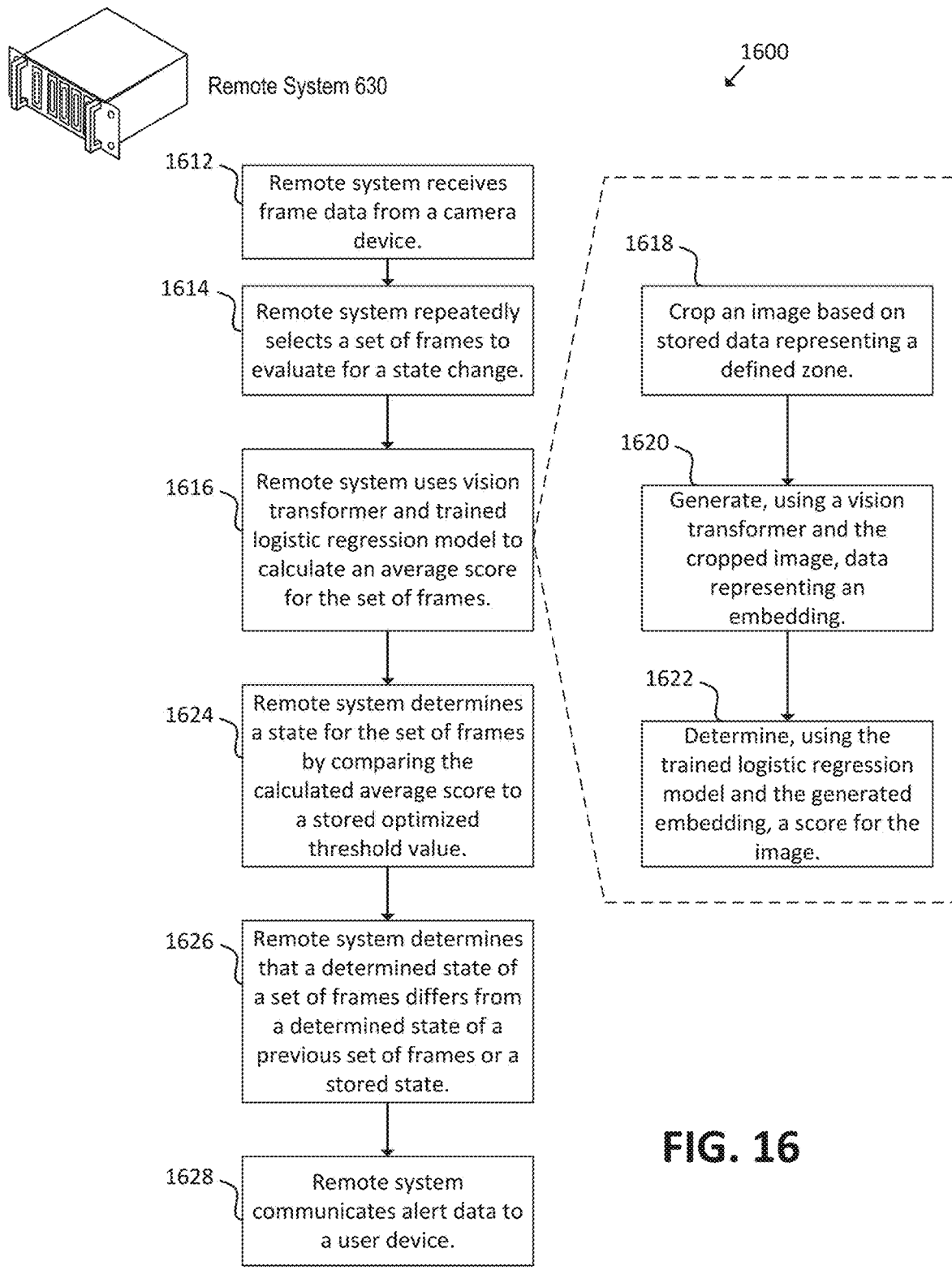
FIG. 16 depicts an example runtime process that may be used to detect a user-defined event based on image data, in accordance with various aspects of the present disclosure.

FIG. 16 depicts an example process 1600 for training and runtime operations for the system 100 performed by remote system 630, in accordance with various aspects of the present disclosure. Those actions in FIG. 16 that have been previously described in reference to FIGS. 1-15 may not be described again herein for purposes of clarity and brevity. The actions of the process depicted in the flow diagram of FIG. 16 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 1600 may begin at action 1612, at which the remote system 630 may receive frame data from camera device 150. For example, the remote system 630 may receive a plurality of frames of image data from camera device 150 at a predetermined frequency (e.g., every minute, every 5 minutes, every 30 seconds, etc.) in order to detect for the occurrence of a user-defined event. Any number of frames of image data may be received according to the desired implementation. In other examples, a triggering event may cause the remote system 630 to receive frames for customized state detection. For example, if the camera device 150 detects motion (e.g., either using computer-vision techniques and/or a motion sensor) streaming may be initiated and frames of image data may be sent to remote system 630 from the camera device 150.

Process 1600 may continue at action 1614, at which the remote system 630 may repeatedly select a set of frames to evaluate for a state change. For example, among a series of frames of image data received by remote system 630 from camera device 150, a sliding window of X frames may be evaluated for a state change.

Process 1600 may continue at action 1616, at which the remote system 630 may use a vision transformer (or other instantiation of the encoder model 104), a trained logistic regression model (or other instantiation of the customized classifier model 108) to determine an average score for the current set of frames. For example, at action 1618, each frame of image data may be cropped to generate a cropped frame of image data that represents the user-defined area-of-interest based on stored data representing the zone in the frame corresponding to the area-of-interest. At action 1620, a vision transformer and/or other image encoder may be used to generate an embedding representing the input cropped image data (for each frame). At action 1622, the trained logistic regression model (or other customized classifier model) may receive the embedding as input and may determine a score for the embedding. This operation may be performed for each input frame.

At action 1624, the remote system 630 may determine a state for the set of frames by comparing the calculated average score (e.g., by averaging the score of each frame of the set of frames (e.g., averaging each score of the sliding window of frames)) to a stored optimized threshold value (e.g., optimized as described above). At action 1626, the remote system 630 may determine that the determined state of the set of frames differs from a determined state of a previous set of frames (e.g., a stored state representing the state of a previous set of frames). This may be accomplished in a variety of ways depending on the desired implementation. For example, the remote system 630 may determine a respective score 112 for each input frame of image data (e.g., over a window size of X frames). In one example, the respective scores 112 may be averaged and the average score may be used to determine a state prediction for the set of frames. In another example, the individual scores of each frame may be used to determine a state of each frame. A determination may be made if there is a consensus state among the set of frames (e.g., if all frames being evaluated have the same state and/or greater than a threshold number of frames have the same state). The determined state for the set of frames may be compared to a most recent state (e.g., stored in memory) to determine if a state change has occurred. In another example, a state change may be detected if the confidence score related to an updated state (e.g., a new state relative to the most recently detected state) is determined for greater than a threshold time period (and/or a threshold number of frames).

In various examples, the embeddings may be stored in memory in association with a state determined in relation to the stored embedding (e.g., door closed). The embeddings may be used to verify the current state and/or the previous state. In some examples, the embeddings at different time steps may be compared to determine if a state change has occurred between the time steps (e.g., between motion detection events). Consider an example where the customized event detection is trained to detect a state change between a garage door being opened and a garage door being closed. At a previous time, the garage door may be closed. Embedding data representing an image in which the garage door is in the closed state may be stored in association with state data indicating that the garage door is in the closed state. At a later time, the garage door may be opened. However, in this example, a motion detection event may not be detected upon the garage door opening (e.g., due to unusual lighting conditions, a network outage, etc.). At some later time, a motion event may be detected which may trigger frames of image data to be evaluated using the customized event detection system. The frames of image data being evaluated may be compared with the most recent embedding and state data stored at the previous time to determine if a state change has occurred. If so, an alert may be sent to the companion application to notify the user that a state change has occurred.

In various examples, confidence scores output by the customized classifier model 108 may be used to determine state change detection. For example, a particular state detected by the customized classifier model 108 may be deemed accurate only if the confidence score (generated by the customized classifier model 108 for the prediction) and/or an average confidence score over a certain period of time exceeds a confidence score threshold. In another example, the confidence score may be required to meet a confidence score threshold for each time step (e.g., each frame of image data) over a given period of time (e.g., N frames) in order to detect a state change event. It should be noted that the particular thresholding techniques to be used may be tuned and/or selected in accordance with the desired implementation. For example, requiring the confidence score of state change to be above a threshold confidence score for each frame of N frames may be a more strict requirement for state change detection vs. determining that an average confidence score over N frames (or another number of frames) exceeds a confidence score threshold. As such, different thresholding techniques may be selected depending on the precision/recall requirements of the particular use case and/or implementation.

At action 1628, the remote system 630 may perform an action in response to the detected state change. The action may be determined based on the particular state change (as configured by the user when defining the custom event). For example, alert data indicating the state change may be sent to a user device that is associated with the camera device 150.

Figure 17:
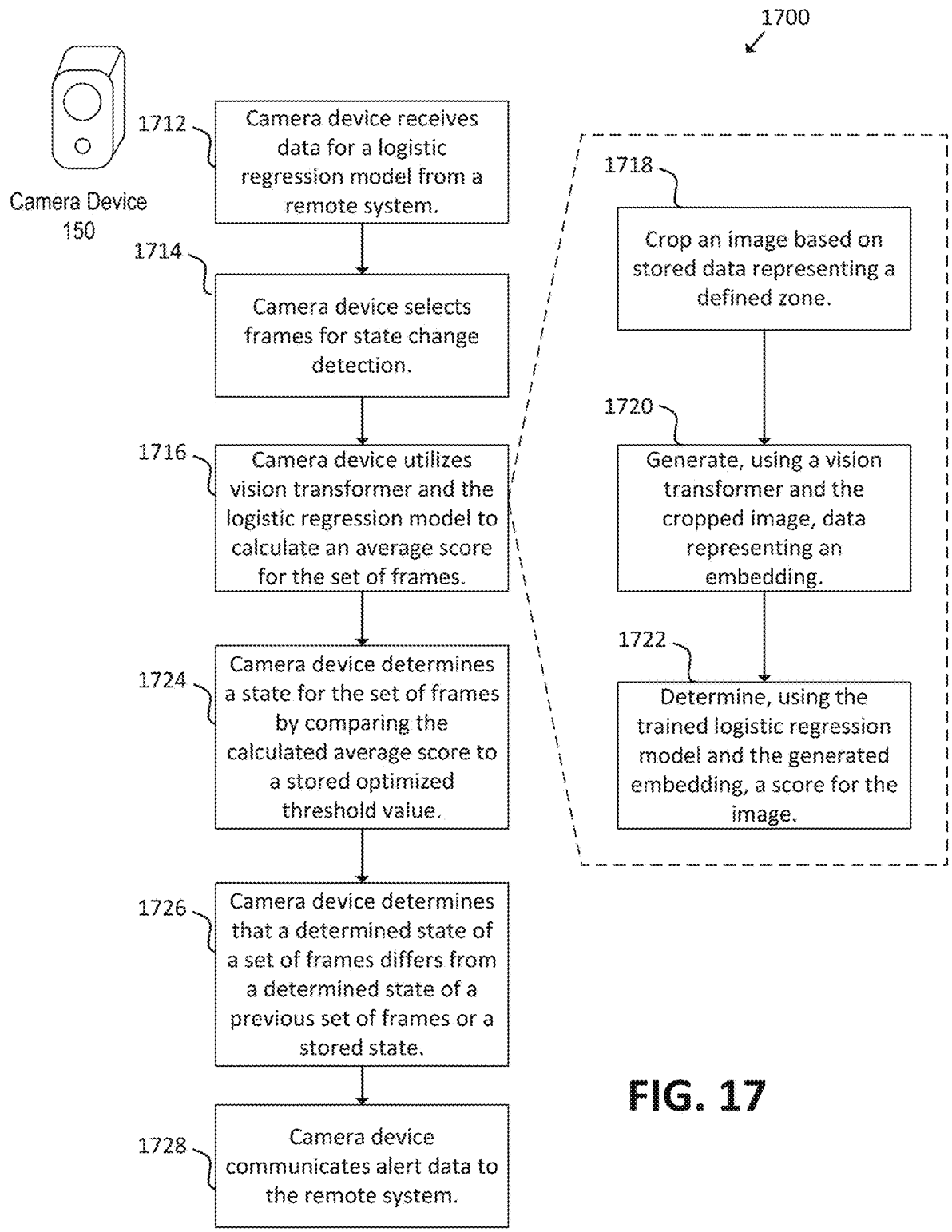
FIG. 17 depicts another example runtime process that may be used to detect a user-defined event based on image data, in accordance with various aspects of the present disclosure.

FIG. 17 depicts an example process 1700 for training and runtime operations for the system 100 performed by camera device 150, in accordance with various aspects of the present disclosure. Those actions in FIG. 16 that have been previously described in reference to FIGS. 1-16 may not be described again herein for purposes of clarity and brevity. The actions of the process depicted in the flow diagram of FIG. 17 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure. FIG. 17 is an example wherein various processing steps (e.g., encoding by encoder model 104 and/or classification by customized classifier model 108) are performed by the camera device 150. However, as previously described with respect to FIG. 16, these processing steps (and/or some of these processing steps) may instead by performed by remote system 630. The selection of a particular device and/or set of devices to perform particular processing steps may depend on the particular implementation and/or on hardware-based constraints of the particular devices being employed.

Process 1700 may begin at action 1712, at which camera device 150 may receive data for a logistic regression model from a remote system 630. For example, the camera device 150 may receive instructions for executing the logistic regression model and/or may receive parameters of the trained logistic regression model that has been trained to detect the user-defined event. In various other examples, the camera device may receive parameters for the encoder model 104 (e.g., a trained instantiation of encoder model 104).

Processing may continue at action 1714, at which the camera device 150 may select a set of captured frames for state change detection. For example, among a series of frames of image data captured by the camera device 150, a sliding window of X frames may be evaluated for a state change. In various examples, state change detection (e.g., user-defined custom event detection) may be triggered by an event, such as motion detection in the scene. For example, if motion is detected either within the scene or within the area-of-interest defined by the user for custom event detection, state change may be evaluated according to the user-defined custom event.

Processing may continue to action 1716, at which camera device 150 may use a vision transformer (or other instantiation of the encoder model 104), a trained logistic regression model (or other instantiation of the customized classifier model 108) to determine an average score for the current set of frames. For example, at action 1718, each frame of image data may be cropped to generate a cropped frame of image data that represents the user-defined area-of-interest based on stored data representing the zone in the frame corresponding to the area-of-interest. At action 1720, a vision transformer and/or other image encoder may be used to generate an embedding representing the input cropped image data (for each frame). At action 1722, the trained logistic regression model (or other customized classifier model) may receive the embedding as input and may determine a score for the embedding. This operation may be performed for each input frame.

At action 1724, the camera device 150 may determine a state for the set of frames by comparing the calculated average score (e.g., by averaging the score of each frame of the set of frames (e.g., averaging each score of the sliding window of frames)) to a stored optimized threshold value (e.g., optimized as described above). At action 1726, the camera device 150 may determine that the determined state of the set of frames differs from a determined state of a previous set of frames (e.g., a stored state representing the state of a previous set of frames).

At action 1728, the camera device 150 may perform an action in response to the detected state change. The action may be determined based on the particular state change (as configured by the user when defining the custom event). For example, the camera device 150 may send alert data indicating the state change may be output by a user device 130 that is associated with the camera device 150.

Figure 18A:
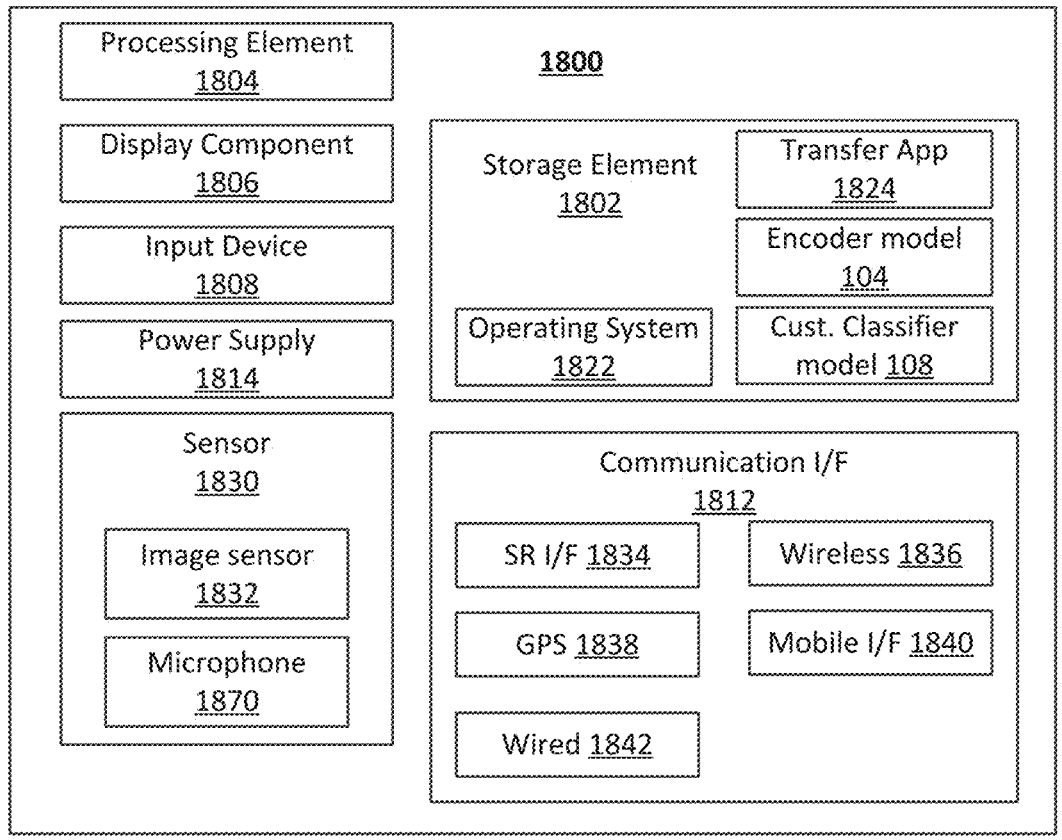
FIG. 18A is a block diagram showing an example architecture of a computing device that may be used in accordance with various aspects of the present disclosure.

FIG. 18A is a block diagram showing an example architecture 1800 of a computing device that may be used to instantiate various components of the system 100 (such as the camera device 150), in accordance with various aspects of the present disclosure. It will be appreciated that not all devices will include all of the components of the architecture 1800 and some user devices may include additional components not shown in the architecture 1800. The architecture 1800 may include one or more processing elements 1804 for executing instructions and retrieving data stored in a storage element 1802. The processing element 1804 may comprise at least one processor. Any suitable processor or processors may be used. For example, the processing element 1804 may comprise one or more digital signal processors (DSPs). The storage element 1802 can include one or more different types of memory, data storage, or computer-readable storage media devoted to different purposes within the architecture 1800. For example, the storage element 1802 may comprise flash memory, random-access memory, disk-based storage, etc. Different portions of the storage element 1802, for example, may be used for program instructions for execution by the processing element 1804, storage of images or other digital works, and/or a removable storage for transferring data to other devices, etc. Additionally, storage element 1802 may store parameters, and/or machine learning models generated using the various techniques described herein. For example, the storage element 1802 may store customized classifier model 108 (and/or the encoder model 104) so that event classification may be performed locally on the device including the image sensor 1832.

The storage element 1802 may also store software for execution by the processing element 1804. An operating system 1822 may provide the user with an interface for operating the computing device and may facilitate communications and commands between applications executing on the architecture 1800 and various hardware thereof. A transfer application 1824 may be configured to receive images, audio, and/or video from another device (e.g., a mobile device, image capture device, and/or display device) or from an image sensor 1832 and/or microphone 1870 included in the architecture 1800.

When implemented in some user devices, the architecture 1800 may also comprise a display component 1806. The display component 1806 may comprise one or more light-emitting diodes (LEDs) or other suitable display lamps. Also, in some examples, the display component 1806 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 1806 may be effective to display image data and/or video data representing custom user-defined events (upon detection), as described herein.

The architecture 1800 may also include one or more input devices 1808 operable to receive inputs from a user. The input devices 1808 can include, for example, a push button, touch pad, touch screen, wheel, joystick, keyboard, mouse, trackball, keypad, light gun, game controller, or any other such device or element whereby a user can provide inputs to the architecture 1800. These input devices 1808 may be incorporated into the architecture 1800 or operably coupled to the architecture 1800 via wired or wireless interface. In some examples, architecture 1800 may include a microphone 1870 or an array of microphones for capturing sounds, such as voice requests. In various examples, audio captured by microphone 1870 may be streamed to external computing devices via communication interface 1812.

When the display component 1806 includes a touch-sensitive display, the input devices 1808 can include a touch sensor that operates in conjunction with the display component 1806 to permit users to interact with the image displayed by the display component 1806 using touch inputs (e.g., with a finger or stylus). The architecture 1800 may also include a power supply 1814, such as a wired alternating current (AC) converter, a rechargeable battery operable to be recharged through conventional plug-in approaches, or through other approaches such as capacitive or inductive charging.

The communication interface 1812 may comprise one or more wired or wireless components operable to communicate with one or more other computing devices. For example, the communication interface 1812 may comprise a wireless communication module 1836 configured to communicate on a network, such as the network 605, according to any suitable wireless protocol, such as IEEE 802.11 or another suitable wireless local area network (WLAN) protocol. A short range interface 1834 may be configured to communicate using one or more short range wireless protocols such as, for example, near field communications (NFC), Bluetooth, Bluetooth LE, etc. A mobile interface 1840 may be configured to communicate utilizing a cellular or other mobile protocol. A Global Positioning System (GPS) interface 1838 may be in communication with one or more earth-orbiting satellites or other suitable position-determining systems to identify a position of the architecture 1800. A wired communication module 1842 may be configured to communicate according to the USB protocol or any other suitable protocol.

The architecture 1800 may also include one or more sensors 1830 such as, for example, one or more position sensors, image sensors, and/or motion sensors. An image sensor 1832 is shown in FIG. 18A. Some examples of the architecture 1800 may include multiple image sensors 1832. For example, a panoramic camera system may comprise multiple image sensors 1832 resulting in multiple images and/or video frames that may be stitched and may be blended to form a seamless panoramic output. An example of an image sensor 1832 may be a camera configured to capture color information, image geometry information, and/or ambient light information. In some further examples, the image sensor 1832 may comprise a depth sensor and/or multiple depth sensors. For example, the image sensor 1832 may include a TOF sensor, stereoscopic depth sensors, a lidar sensor, radar, etc.

Figure 18B:
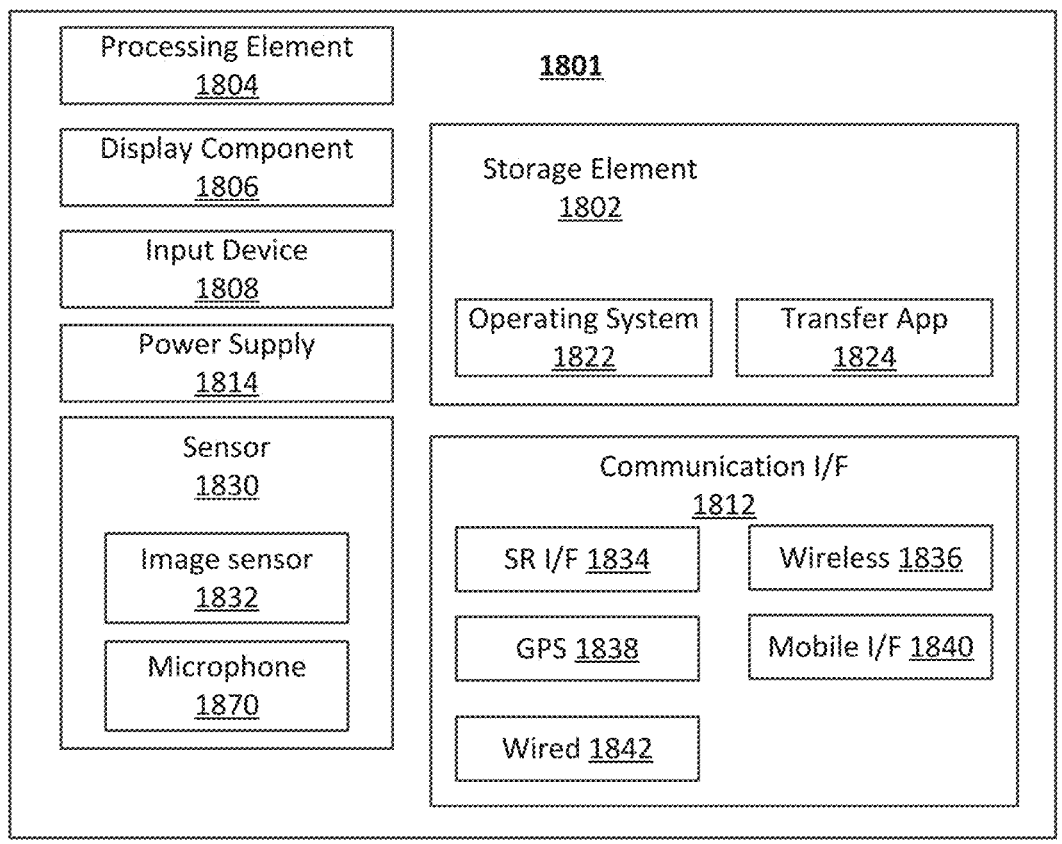
FIG. 18B is a block diagram showing another example architecture of a computing device that may be used in accordance with various aspects of the present disclosure.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system. FIG. 18B depicts another example architecture 1801. Architecture 1801 may be, for example, an example of camera device 150 where the encoder model 104 and/or the customized classifier model 108 are executed remotely with respect to the architecture 1801 (e.g., by remote system 630).

Figure 19:
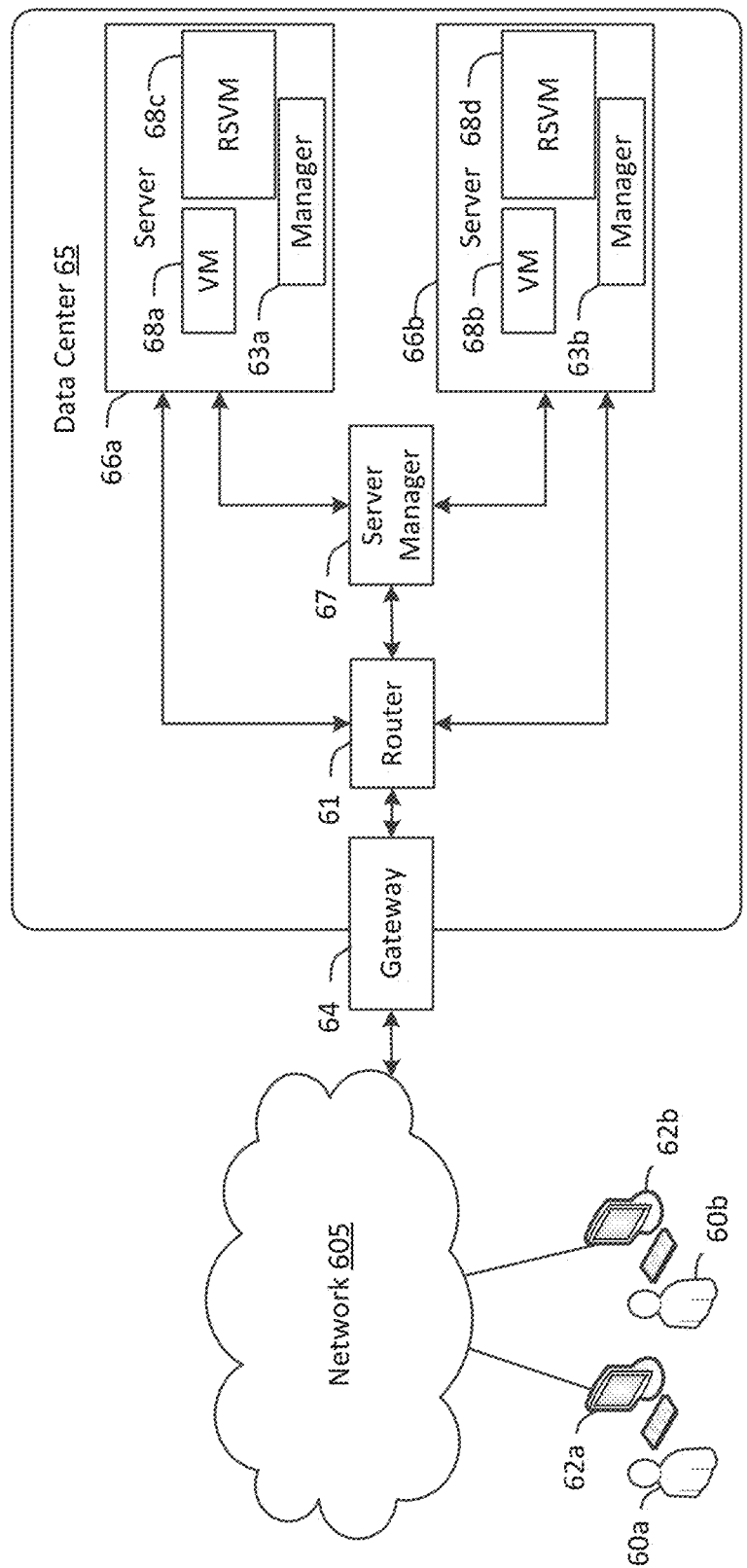
FIG. 19 is a diagram illustrating an example system for sending and providing data that may be used in accordance with the present disclosure.

An example system for sending and providing data will now be described in detail. In particular, FIG. 19 illustrates an example computing environment in which the embodiments described herein may be implemented. For example, the computing environment of FIG. 19 may be used to provide the various machine learning models described herein as a service over a network wherein one or more of the techniques described herein may be requested by a first computing device and may be performed by a different computing device configured in communication with the first computing device over a network. FIG. 19 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 605. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 19 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 19, network 605 may, for example, be a publicly accessible network of linked networks and possibly operated by various distinct parties, such as the Internet. In other embodiments, network 605 may be a private network, such as a corporate or university network that is wholly or partially inaccessible to non-privileged users. In still other embodiments, network 605 may include one or more private networks with access to and/or from the Internet.

Network 605 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 19, a router 61 may be utilized to interconnect the servers 66a and 66b. Router 61 may also be connected to gateway 64, which is connected to network 605. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 19, a data center 65 is also employed to at least in part direct various communications to, from and/or between servers 66a and 66b. While FIG. 19 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 19 has been greatly simplified and that many more networks and networking devices may be utilized to interconnect the various computing systems disclosed herein. These network topologies and devices should be apparent to those skilled in the art.

It should also be appreciated that data center 65 described in FIG. 19 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
   receiving, from a user device associated with a user, first label data indicating a first image and a first user-defined state, the first image having been captured by a first camera device associated with the user;
   receiving, from the user device, second label data indicating a second image associated with a second user-defined state, the second image having been captured by the first camera device associated with the user;
   for each respective image of a first set of images comprising the first image and the second image, generating, using a first pre-trained encoder model executed by the first camera device, respective embedding data; and
   training, by the first camera device, a second machine learning model to classify images as corresponding to the first user-defined state or the second user-defined state based at least in part on the first label data, the second label data, and the embedding data for the images of the first set of images,
   wherein the first label data is associated with a second set of images comprising the first image,
   wherein the first set of images includes the second set of images,
   wherein the second label data is associated with a third set of images comprising the second image,
   wherein the first set of images includes the third set of images, and
   wherein the computer-implemented method comprises, prior to generating the respective embedding data for each respective image of the first set of images using the first pre-trained encoder model:
       selecting a first plurality of images from the second set of images and the third set of images;
       training a third machine learning model to classify images as corresponding to the first user-defined state or the second user-defined state based at least in part on the first label data, the second label data, and the first plurality of images;
       determining, using the third machine learning model, a first state for a third image from the first set of images that is not part of the first plurality of images; and
       comparing, based on the first label data, the first state to a state associated with the third image.

2. The computer-implemented method of claim 1, wherein the method further comprises receiving, from the user device associated with the user, boundary data indicating a boundary for an area of interest; and
   wherein generating respective embedding data for each respective image of the first set of images comprises, for each respective image, generating, based on the respective image and the boundary data, cropped image data representing a cropped version of the respective image.

3. The computer-implemented method of claim 1, wherein:
   the first pre-trained encoder model is a pre-trained vision transformer model, a pre-trained convolutional neural network model, a pre-trained neural network model, a pre-trained graph neural network model, a pre-trained graph convolutional neural network model, a pre-trained capsule neural network model, a pre-trained support vector machine model, or a pre-trained model utilizing vision transformation and convolution; and
   the second machine learning model is a logistic regression model trained using data associated with the first camera device, a convolutional neural network model, a neural network model, a graph neural network model, a graph convolutional neural network model, a support vector machine model, or a vision transformer model.

4. The computer-implemented method of claim 1, wherein the second machine learning model comprises a logistic regression model.

5. The computer-implemented method of claim 1, comprising determining, based on a plurality of images of the first set of images, a first threshold value associated with one or more of the first or second user-defined states.

6. The computer-implemented method of claim 1, wherein the method comprises determining, based on a plurality of images of the first set of images, a first threshold value associated with the first user-defined state, and a second threshold value associated with the second user-defined state.

7. The computer-implemented method of claim 5, wherein the method comprises:
   for each value of a plurality of potential threshold values,
       determining a respective precision value based on a determined respective number of true positives and a determined respective number of false positives,
       determining a respective recall value based on the determined respective number of true positives and a determined respective number of false negatives, and
       determining a respective f-score value based on the determined respective precision value and the determined respective recall value; and
   determining the first threshold value based on the determined f-score values.

8. The computer-implemented method of claim 1, wherein the first label data indicates a second set of images comprising the first image, and wherein the first set of images includes the second set of images.

9. The computer-implemented method of claim 1, wherein the first set of images comprises one or more images generated based on the first image or the second image.

10. The computer-implemented method of claim 1, wherein the first set of images comprises one or more images generated based on utilizing data augmentation techniques to modify the first image or the second image.

11. A system comprising:
 at least one processor; and
 non-transitory computer-readable memory storing instructions that, when executed by the at least one processor, are effective to:
  receive, from a user device associated with a user, first label data indicating a first image and a first user-defined state, the first image having been captured by a first camera device associated with the user;
  receive, from the user device, second label data indicating a second image associated with a second user-defined state, the second image having been captured by the first camera device associated with the user;
  for each respective image of a first set of images comprising the first image and the second image, generate, using a first pre-trained encoder model, respective embedding data; and
  train a second machine learning model to classify images as corresponding to the first user-defined state or the second user-defined state based at least in part on the first label data, the second label data, and the embedding data for the images of the first set of images,
  wherein the first label data is associated with a second set of images comprising the first image,
  wherein the first set of images includes the second set of images,
  wherein the second label data is associated with a third set of images comprising the second image,
  wherein the first set of images includes the third set of images, and
  wherein the non-transitory computer-readable memory stores further instructions that, when executed by the at least one processor, are further effective to, prior to generating the respective embedding data for each respective image of the first set of images using the first pre-trained encoder model:
   select a first plurality of images from the second set of images and the third set of images;
   train a third machine learning model to classify images as corresponding to the first user-defined state or the second user-defined state based at least in part on the first label data, the second label data, and the first plurality of images;
   determine, using the third machine learning model, a first state for a third image from the first set of images that is not part of the first plurality of images; and
   compare, based on the first label data, the first state to a state associated with the third image.

12. The system of claim 11, the non-transitory computer-readable memory storing further instructions that, when executed by the at least one processor, are further effective to:
 receive, from the user device associated with the user, boundary data indicating a boundary for an area of interest;
 wherein to generate respective embedding data for each respective image of the first set of images the at least one processor is further effective to, for each respective image, generate, based on the respective image and the boundary data, cropped image data representing a cropped version of the respective image.

13. The system of claim 11, wherein:
 the first pre-trained encoder model is a pre-trained vision transformer model, a pre-trained convolutional neural network model, a pre-trained neural network model, a pre-trained graph neural network model, a pre-trained graph convolutional neural network model, a pre-trained capsule neural network model, a pre-trained support vector machine model, or a pre-trained model utilizing vision transformation and convolution; and
 the second machine learning model is a logistic regression model trained using data associated with the first camera device, a convolutional neural network model, a neural network model, a graph neural network model, a graph convolutional neural network model, a support vector machine model, or a vision transformer model.

14. The system of claim 11, wherein the second machine learning model comprises a logistic regression model.

15. The system of claim 11, the non-transitory computer-readable memory storing further instructions that, when executed by the at least one processor, are further effective to:
 determine, based on a plurality of images of the first set of images, a first threshold value associated with one or more of the first or second user-defined states.

16. The system of claim 11, the non-transitory computer-readable memory storing further instructions that, when executed by the at least one processor, are further effective to:
 determine, based on a plurality of images of the first set of images, a first threshold value associated with the first user-defined state, and a second threshold value associated with the second user-defined state.

17. The system of claim 15, the non-transitory computer-readable memory storing further instructions that, when executed by the at least one processor, are further effective to:
 for each value of a plurality of potential threshold values,
  determine a respective precision value based on a determined respective number of true positives and a determined respective number of false positives,
  determine a respective recall value based on the determined respective number of true positives and a determined respective number of false negatives,
  determine a respective f-score value based on the determined respective precision value and the determined respective recall value; and
 determine the first threshold value based on the determined f-score values.

18. The system of claim 11, wherein the first label data indicates a second set of images comprising the first image, and wherein the first set of images includes the second set of images.

19. A system comprising:
 a first camera;
 at least one processor; and
 non-transitory computer-readable memory storing instructions that, when executed by the at least one processor, are effective to:
  receive, from a user device associated with a user, first label data indicating a first image and a first user-defined state, the first image having been captured by the first camera;
  receive, from the user device, second label data indicating a second image associated with a second user-defined state, the second image having been captured by the first camera;

for each respective image of a first set of images comprising the first image and the second image, generate, using a first pre-trained encoder model, respective embedding data; and train a second machine learning model to classify images as corresponding to the first user-defined state or the second user-defined state based at least in part on the first label data, the second label data, and the embedding data for the images of the first set of images, wherein the first label data is associated with a second set of images comprising the first image, wherein the first set of images includes the second set of images, wherein the second label data is associated with a third set of images comprising the second image, wherein the first set of images includes the third set of images, and wherein the non-transitory computer-readable memory stores further instructions that, when executed by the at least one processor, are further effective to, prior to generating the respective embedding data for each respective image of the first set of images using the first pre-trained encoder model:

select a first plurality of images from the second set of images and the third set of images;

train a third machine learning model to classify images as corresponding to the first user-defined state or the second user-defined state based at least in part on the first label data, the second label data, and the first plurality of images;

determine, using the third machine learning model, a first state for a third image from the first set of images that is not part of the first plurality of images; and compare, based on the first label data, the first state to a state associated with the third image.

* * * * *